US006931433B1

(12) United States Patent
Ralston et al.

(10) Patent No.: US 6,931,433 B1
(45) Date of Patent: Aug. 16, 2005

(54) PROCESSING OF UNSOLICITED BULK ELECTRONIC COMMUNICATION

(75) Inventors: Geoffrey D. Ralston, Menlo Park, CA (US); David H. Nakayama, Palo Alto, CA (US); Matthew E. Lewin, Santa Clara, CA (US); Ravichandran Menon Jayachandran, Sunnyvale, CA (US); Brian R. Woods, San Francisco, CA (US); Udi Manber, Palo Alto, CA (US)

(73) Assignee: Yahoo! Inc., Santa Clara, CA (US)

( * ) Notice: Subject to any disclaimer, the term of this patent is extended or adjusted under 35 U.S.C. 154(b) by 697 days.

(21) Appl. No.: 09/774,870

(22) Filed: Jan. 31, 2001

Related U.S. Application Data

(63) Continuation-in-part of application No. 09/728,524, filed on Dec. 1, 2000, which is a continuation-in-part of application No. 09/645,645, filed on Aug. 24, 2000.

(51) Int. Cl.⁷ .............................................. H06F 15/16
(52) U.S. Cl. ...................................... 709/206; 709/207
(58) Field of Search ................................ 709/204–207, 709/218

(56) References Cited

U.S. PATENT DOCUMENTS

| | | | |
|---|---|---|---|
| 5,909,677 A | 6/1999 | Broder et al. ................... 707/3 |
| 5,974,481 A | 10/1999 | Broder .......................... 710/49 |
| 5,999,932 A | 12/1999 | Paul | |
| 5,999,967 A | 12/1999 | Sundsted | |
| 6,023,723 A | 2/2000 | McCormick et al. ........ 709/206 |
| 6,052,709 A | 4/2000 | Paul .............................. 709/202 |
| 6,072,942 A | 6/2000 | Stockwell et al. ...... 395/200.36 |
| 6,101,531 A * | 8/2000 | Eggleston et al. ........... 709/206 |
| 6,161,130 A | 12/2000 | Horvitz et al. | |
| 6,167,434 A * | 12/2000 | Pang ........................... 709/206 |
| 6,199,103 B1 | 3/2001 | Sakaguchi et al. | |
| 6,249,807 B1 | 6/2001 | Shaw et al. | |
| 6,266,692 B1 * | 7/2001 | Greenstein ................... 709/206 |
| 6,321,267 B1 | 11/2001 | Donaldson | |
| 6,330,590 B1 * | 12/2001 | Cotten ......................... 709/206 |
| 6,351,764 B1 | 2/2002 | Voticky et al. | |
| 6,393,465 B2 | 5/2002 | Leeds | |
| 6,421,709 B1 * | 7/2002 | McCormick et al. ........ 709/206 |
| 6,453,327 B1 | 9/2002 | Neilsen | |
| 6,460,050 B1 * | 10/2002 | Pace et al. ................ 707/104.1 |
| 6,546,416 B1 * | 4/2003 | Kirsch ......................... 709/206 |
| 6,654,787 B1 | 11/2003 | Aronson et al. | |
| 6,687,740 B1 | 2/2004 | Gough et al. | |
| 6,842,773 B1 * | 1/2005 | Ralston et al. .............. 709/206 |
| 2001/0034769 A1 | 10/2001 | Rast | |
| 2003/0132972 A1 | 7/2003 | Pang | |

OTHER PUBLICATIONS

Manber, Udi, "Finding Similar Files in a Large File System," *Dept. Computer Sci. Univ. Arizona*, Oct. 1993.

(Continued)

*Primary Examiner*—Glenton B. Burgess
*Assistant Examiner*—Yasin Barqadle
(74) *Attorney, Agent, or Firm*—Townsend and Townsend and Crew LLP

(57) ABSTRACT

The invention relates to processing of electronic text communication distributed in bulk. In one embodiment, a method for detecting electronic text communication distributed in bulk is disclosed. After receiving a first electronic text communication, it is processed with an algorithm to produce a first fingerprint. A time period is begun for the first electronic text communication. After receiving a second electronic text communications, it is also processed with the algorithm to produce a second fingerprint. The first fingerprint to the second fingerprint are compared to determine if the first electronic text communication is similar to the second electronic text communication. A count for the first electronic text communication is updated based upon the comparison. It is determined if the count during the time period reaches a first threshold.

23 Claims, 26 Drawing Sheets

OTHER PUBLICATIONS

Iwanchuk, Russell, "Integralis Inc.:MIMEsweeper" *PC Magazine,* http://www.zdnet.com/products/content/pcmg/1607/pcmg0221.html, Apr. 8, 1997.

Sullivan, Eamonn, "The 'Star Wars' phase of anti-spam tools," *PC Week Online,* http://www.zdnet.com/eweek/opinion/0316/16isigh.html, Mar. 16, 1998.

"SpamEater Pro 2.7.0" *PC Magazine,* http://www.zdnet.com/pcmag/stories/reviews/0,6755,410471,00.html, Aug. 17, 1999.

"Spam Buster 1.63", *PC Magazine,* http://www.zdnet.com/pcmag/stories/reviews/0,6755,410470,00.html;, Aug. 17, 1999.

"More Spam Fighters," *PC Magaizine,* Aug. 18, 1999.

Hu, Jim, "Yahoo adds spam filter to email, but will it work?" http://news.cnet.com/category/0-1005-200-1476013.html, Dec. 1, 1999.

Festa, Paul, "Are new Yahoo, Hotmail spam filters better than past efforts?" http://news.cnet.com/category/0-1005-200-1488576.html, Dec. 8, 1999.

"How does Brightmail know which email is spam?" http://www.brightmail.com/cgi-binj/faq/cgi?type=one&query=9, Jan. 12, 2000.

Festa, Paul, "Yahoo, others move to defuse email password-stealing threat," http://news.cnet.com/news/0-1005-202-1845138.html, May 9, 2000.

Hampton, Catherine A., "The Spam Bouncer," version 1.01, http://www.spambouncer.org, May 15, 2000.

"Spam Buster Overview: Spam Criteria," http://www.contactplus.com/products/spam/spamover/overview2.htm, printed May 19, 2000.

"Hit back at the Spammers!" http://www.cix.co.uk/~net-services/spam/spam_hater.htm, printed May 19, 2000.

"Flame Thrower," http://www.xeaglex.com/ftfaq.html, printed May 19, 2000.

"Flame Thrower Frequently Asked Questions," http://www.xeaglex.com/ftfaq.html, printed May 19, 2000.

Rimmer, Steven William, "Death to Spam: A Guide to Dealing with Unwanted E-mail," http://www.mindworkshop.com/alchemy/nospam.html, printed Jul. 14, 2000.

"Welcome, Hungry Spambots!" http://www.obliquity.com/computer/spambait/, printed Jul. 14, 2000.

"Manuals," http:www.karkamiel.com/manuals.htm, printed Jul. 14, 2000.

"Manuals-The Source," http:www.karkamiel.com/source.htm, printed Jul. 14, 2000.

"Manuals-Open Relay," http:www.karkamiel.com/or.htm, printed Jul. 14, 2000.

"Manuals-Website," http:www.karkamiel.com/website.htm, printed Jul. 14, 2000.

"Manuals-Glossary," http:www.karkamiel.com/glossary.htm, printed Jul. 14, 2000.

"Manuals-Forgery," http:www.karkamiel.com/forgery.htm, printed Jul. 14, 2000.

"Manuals-Forgery II," http:www.karkamiel.com/forgery2.htm, printed Jul. 14, 2000.

Prakash, Vipul Ved, "Ricochet: Automated agent for tracing and reporting internet junk mail," printed Jul. 14, 2000.

\* cited by examiner

```
From free@remote.host1.com Thu May 18 16:31:05 3000
Received: from proxy3.remote.host2.com (root@remote.host2.com [192.168.100.100])
    by shell3.remote.host2.com (8.9.3/8.9.2/host2.sh) with ESMTP id QAA07313
    for <a3+XRCPT.77616e6973684079656e646f722e636f6d@shell3.remote.host2.com>
    Thu, 18 May 3000 16:30:30 -0700 (PDT)
From: free@remote.host1.com Received: from local.host.com (([192.168.101.101])
    by proxy3.remote.host2.com (8.9.3/8.9.2/best.in) with ESMTP id QAA02064
    for <a3@host3.com>; Thu, 18 May 3000 16:28:52 -0700 (PDT)
Received: from 192.168.104.104 (remote.host6.com [192.168.102.102])
    by local.host.com (8.8.8+Sun/8.8.8) with SMTP id RAA03730;
    Thu, 18 May 3000 17:28:46 GMT
Received: from mailhost.host4.com[alt.host4.com[192.168.103.103]] by
    host4101.com (8.8.5/8.6.5) with SMTP id GAA06095 for <money4@host5.com>;
    Thu, 18 May 3000 18:47:20 -0600 (EST)
To: money4@host544.com Message-ID: <200249362.EBY100599@host4101.com>
Date: Thu, 18 May 00 18:47:20 EST
Subject: SNAKE OIL CURE ONLY $99!!
Reply-To: money4@host544.com X-UIDL: 4447br19h78989nnjhyrd9mkh098muht5
Comments: Authenticated sender is <Free@host4101.com>
X-Rcpt-To: a3@host356.com
```

FIG. 9 (Prior Art)

PROCESSING OF UNSOLICITED BULK ELECTRONIC COMMUNICATION

This application is a continuation-in-part of U.S. application Ser. No. 09/728,524 filed on Dec. 1, 2000 that is a continuation-in-part of U.S. application Ser. No. 09/645,645 filed on Aug. 24, 2000. The present invention is related to commonly owned and co-pending U.S. patent application Ser. No. 09/774,439 entitled "Unsolicited Electronic Mail Reduction".

BACKGROUND OF THE INVENTION

This invention relates in general to electronic distribution of information and, more specifically, to blocking of unsolicited electronic text communication or advertizement distributed in bulk.

Unsolicited advertisement permeates the Internet. They very technology that enabled the success of the Internet is used by unsolicited advertisers to annoy the legitimate users of the Internet. The entities that utilize unsolicited advertisement use automated software tools to distribute the advertisement with little or no cost to themselves. Costs of the unsolicited advertisement are borne by the viewers of the advertisement and the Internet infrastructure companies that distribute the advertisement.

Unsolicited advertisement is showing up in chat rooms, newsgroup forums, electronic mail, automated distribution lists, on-line classifieds, and other on-line forums. Some chat rooms are so inundated with unsolicited advertisement that use for legitimate purposes is inhibited. Many users receive ten to fifty unsolicited e-mail messages per day such that their legitimate e-mail is often obscured in the deluge. On-line personal classified ad forums are also experiencing posts from advertisers in violation of the usage guidelines for these forums.

Customer service representatives and moderators are sometimes used to determine the unsolicited advertisement and remove it. This solution requires tremendous human capital and is an extremely inefficient tool-to combat the automated tools of the unsolicited advertisers. Clearly, improved methods for blocking unsolicited advertisement is desirable.

SUMMARY OF THE INVENTION

The invention relates to processing of electronic text communication distributed in bulk. In one embodiment, a method for detecting electronic text communication distributed in bulk is disclosed. After receiving a first electronic text communication, it is processed with an algorithm to produce a first fingerprint. A time period is begun for the first electronic text communication. After receiving a second electronic text communications, it is also processed with the algorithm to produce a second fingerprint. The first fingerprint to the second fingerprint are compared to determine if the first electronic text communication is similar to the second electronic text communication. A count for the first electronic text communication is updated based upon the comparison. It is determined if the count during the time period reaches a first threshold.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

FIG. 9 is an embodiment of an unsolicited e-mail header revealing a route through an open relay and forged routing information;

DESCRIPTION OF THE SPECIFIC EMBODIMENTS

The present invention processes electronic text communication to detect unsolicited advertisement distributed in inappropriate forums. Detecting the amount of electronic text communication over a time period provides insight into what may be unsolicited. By using algorithms that detect similar electronic text communications, patterns of distribution over time can be determined. Filtration of further intrusions from the senders of the unsolicited communication is possible once it is detected.

In the Figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
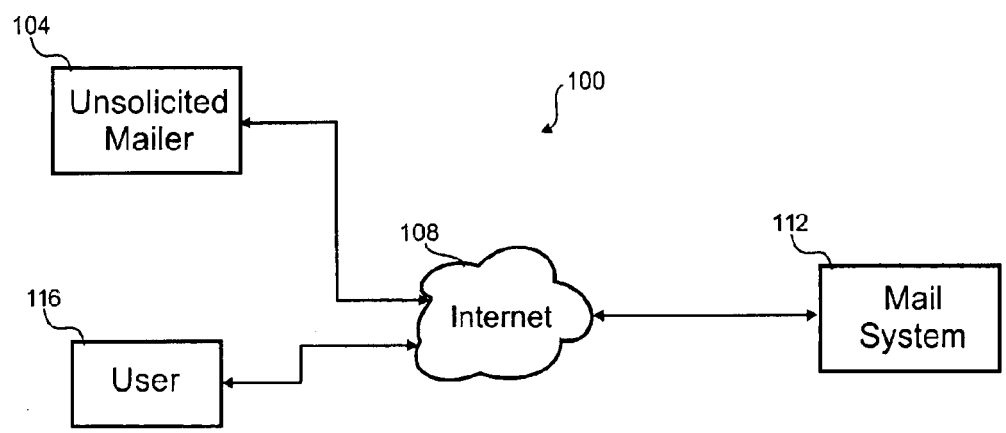
FIG. 1 is a block diagram of one embodiment of an e-mail distribution system.

Referring first to FIG. 1, a block diagram of one embodiment of an e-mail distribution system 100 is shown. Included in the distribution system 100 are an unsolicited mailer 104, the Internet 108, a mail system, and a user 116. The Internet 108 is used to connect the unsolicited mailer 104, the mail system 112 and the user, although, direct connections or other wired or wireless networks could be used in other embodiments.

The unsolicited mailer 104 is a party that sends e-mail indiscriminately to thousands and possibly millions of unsuspecting users 116 in a short period time. Usually, there is no preexisting relationship between the user 116 and the unsolicited mailer 104. The unsolicited mailer 104 sends an e-mail message with the help of a list broker. The list broker provides the e-mail addresses of the users 116, grooms the list to keep e-mail addresses current by monitoring which addresses bounce and adds new addresses through various harvesting techniques.

The unsolicited mailer provides the e-mail message to the list broker for processing and distribution. Software tools of the list broker insert random strings in the subject, forge e-mail addresses of the sender, forge routing information, select open relays to send the e-mail message through, and use other techniques to avoid detection by conventional detection algorithms. The body of the unsolicited e-mail often contains patterns similar to all e-mail messages broadcast for the unsolicited mailer 104. For example, there is contact information such as a phone number, an e-mail address, a web address, or postal address in the message so the user 116 can contact the unsolicited mailer 104 in case the solicitation triggers interest from the user 116.

The mail system 112 receives, filters and sorts e-mail from legitimate and illegitimate sources. Separate folders within the mail system 112 store incoming e-mail messages for the user 116. The messages that the mail system 112 suspects are unsolicited mail are stored in a folder called "Bulk Mail" and all other messages are stored in a folder called "Inbox." In this embodiment, the mail system is operated by an e-mail application service provider (ASP). The e-mail application along with the e-mail messages are stored in the mail system 112. The user 116 accesses the application remotely via a web browser without installing any e-mail software on the computer of the user 116. In alternative embodiments, the e-mail application could reside on the computer of the user and only the e-mail-messages would be stored on the mail system.

The user 116 machine is a subscriber to an e-mail service provided by the mail system 112. An internet service provider (ISP) connects the user machine 116 to the Internet. The user activates a web browser and enters a universal resource locator (URL) which corresponds to an internet protocol (IP) address of the mail system 112. A domain name server (DNS) translates the URL to the IP address, as is well known to those of ordinary skill in the art.

Figure 2:
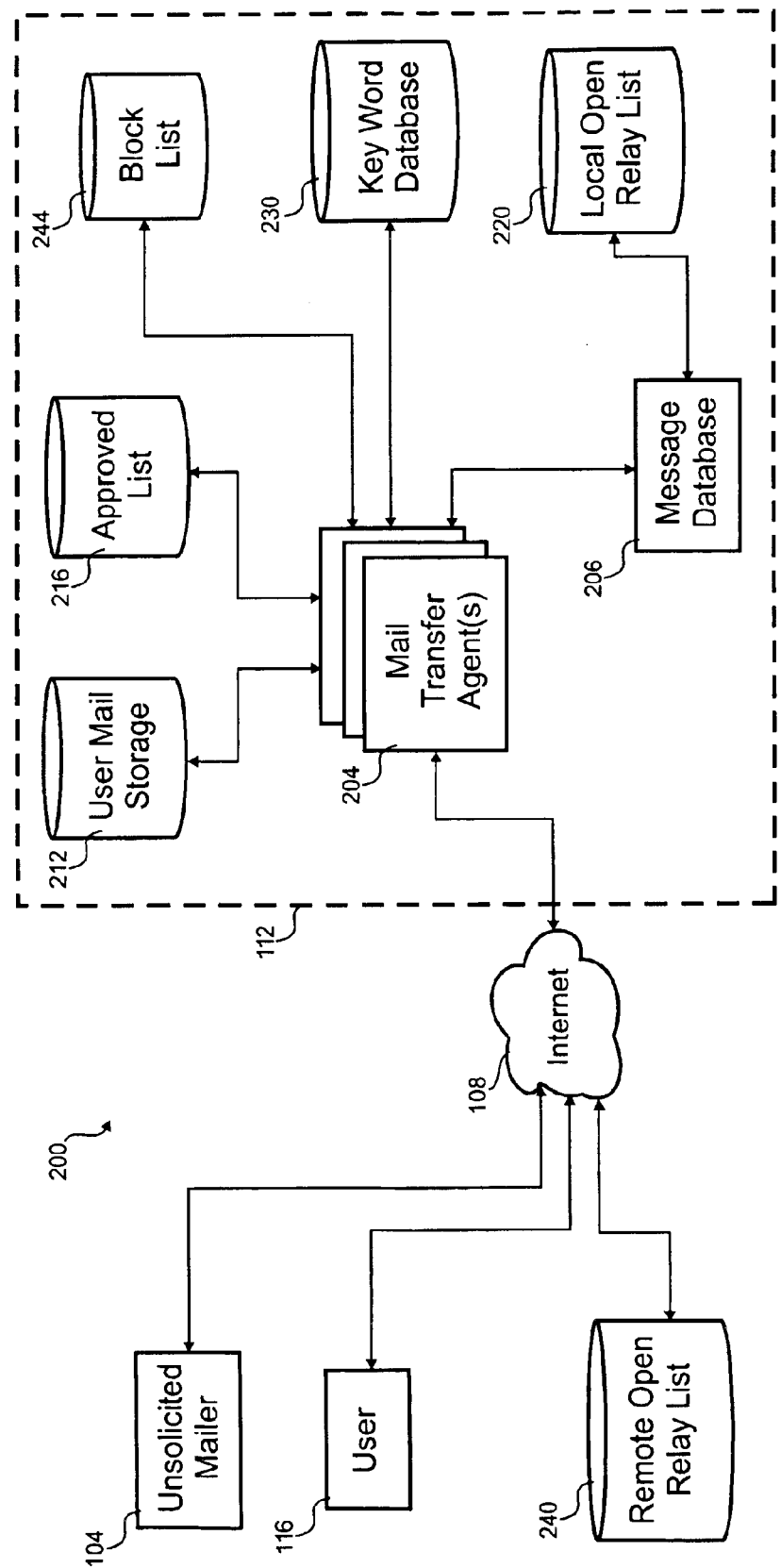
FIG. 2 is a block diagram of an embodiment of an e-mail distribution system.

With reference to FIG. 2, a block diagram of an embodiment of an e-mail distribution system 200 is shown. This embodiment includes the unsolicited mailer 104, Internet 108, mail system 112, and a remote open relay list 240. Although not shown, there are other solicited mailers that could be businesses or other users. The user 116 generally welcomes e-mail from solicited mailers.

E-mail messages are routed by the Internet through an unpredictable route that "hops" from relay to relay. The route taken by an e-mail message is documented in the e-mail message header. For each relay, the IP address of that relay is provided along with the IP address of the previous relay. In this way, the alleged route is known by inspection of the message header.

The remote open relay list 240 is located across the Internet 108 and remote to the mail system 112. This list 240 includes all know relays on the Internet 108 that are misconfigured or otherwise working improperly. Unlike a normal relay, an open relay does not correctly report where the message came from. This allows list brokers and unsolicited mailers 104 to obscure the path back to the server that originated the message. This subterfuge avoids some filters of unsolicited e-mail that detect origination servers that correspond to known unsolicited mailers 104 or their list brokers.

As first described above in relation to FIG. 1, the mail system 112 sorts e-mail messages and detects unsolicited e-mail messages. The mail system 112 also hosts the mail application that allows the user to view his or her e-mail. Included in the mail system 112 are one or more mail transfer agents 204, user mail storage 212, an approved list 216, a block list 244, a key word database 230, and a message database 206.

The mail transfer agents 204 receive the e-mail and detect unsolicited e-mail. To handle large amounts of messages, the incoming e-mail is divided among one or more mail transfer agents 204. Similarly, other portions of the mail system could have redundancy to spread out loading. Once the mail transfer agent 204 gets notified of the incoming e-mail message, the mail transfer agent 204 will either discard the message, store the message in the account of the user, or store the message in a bulk mail folder of the user. The message database 206, the remote open relay list 240, an approved list 216, a block list 244, a key word database 230, and/or a local open relay list 220 are used in determining if a received e-mail message was most-likely sent from an unsolicited mailer 104.

The user mail storage 212 is a repository for e-mail messages sent to the account for the user. For example, all e-mail messages addressed to samlf34z@yahoo.com would be stored in the user mail storage 212 corresponding to that e-mail address. The e-mail messages are organized into two or more folders. Unsolicited e-mail is filtered and sent to the bulk mail folder and other e-mail is sent by default to the inbox folder. The user 116 can configure a sorting algorithm to sort incoming e-mail into folders other than the inbox.

The approved list 216 contains names of known entities that regularly send large amounts of solicited e-mail to users. These companies are known to send e-mail only when the contact is previously assented to. Examples of who may be on this list are Yahoo.com, Amazon.com, Excite.com, Microsoft.com, etc. Messages sent by members of the approved list 216 are stored in the user mail storage 212 without checking to see if the messages are unsolicited. Among other ways, new members are added to the approved list 216 when users complain that solicited e-mail is being filtered and stored in their bulk mail folder by mistake. A customer service representative reviews the complaints and adds the IP address of the domains to the approved list 216. Other embodiments could use an automated mechanism for adding domains to the approved list 216 such as when a threshold amount of users complain about improper filtering, the domain is automatically added to the list 216 without needing a customer service representative. For example, the algorithms described with relation to FIGS. 7A–7D below could be used to determine when a threshold amount of users have forwarded an e-mail that they believe was mistakenly sorted to the bulk mail folder.

The block list 244 includes IP addresses of list brokers and unsolicited mailers 104 that are known to send mostly unsolicited e-mail. A threshold for getting on the block list 244 could be sending one, five, ten, twenty or thirty thousand messages in a week. The threshold can be adjusted to a percentage of the e-mail messages received by the mail system 112. A member of the approved list 216 is excluded from also being on the block list 244 in this embodiment.

When the mail transfer agent 204 connects to the relay presenting the e-mail message, a protocol-level handshaking occurs. From this handshaking process, the protocol-level or actual IP address of that relay is known. E-mail message connections from a member of the block list 244 are closed down without receiving the e-mail message. Once the IP address of the sender of the message is found on the block list 244, all processing stops and the connection to the IP address of the list broker or unsolicited mailer 104 is broken. The IP address checked against the block list 244 is the actual IP address resulting from the protocol-level handshaking process and is not the derived from the header of the e-mail message. Headers from e-mail messages can be forged as described further below.

The key word database 230 stores certain terms that uniquely identify an e-mail message that contains any of those terms as an unsolicited message. Examples of these key words are telephone numbers, URLs or e-mail addresses that are used by unsolicited mailers 104 or list brokers. While processing e-mail messages, the mail transfer agent 204 screens for these key words. If a key word is found, the e-mail message is discarded without further processing.

The local open relay list 220 is similar to the remote open relay list 240, but is maintained by the mail system 112. Commonly used open relays are stored in this list 220 to reduce the need for query to the Internet for open relay information, which can have significant latency. Additionally, the local open relay list 220 is maintained by the mail system 112 and is free from third party information that may corrupt the remote open relay list 240.

The message database 206 stores fingerprints for messages received by the mail system 112. Acting as a server, the message database 206 provides fingerprint information to the mail transfer agent 204 during processing of an e-mail message. Each message is processed to generate a fingerprint representative of the message. The fingerprint is usually more compact than the message and can be pattern matched more easily than the original message. If a fingerprint matches one in the message database 206, the message may be sorted into the bulk mail folder of the user. Any message unique to the mail system has its fingerprint stored in the message database 206 to allow for matching to subsequent messages. In this way, patterns can be uncovered in the messages received by the mail system 112.

Figure 3A:
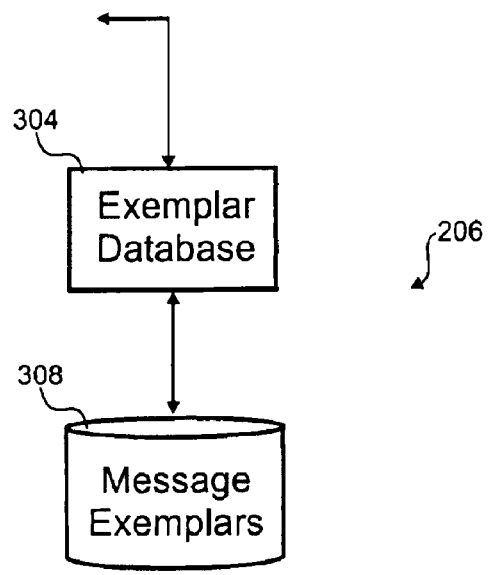
FIG. 3A is a block diagram of an embodiment of a message database.

Referring next to FIG. 3A, a block diagram of an embodiment of a message database 206 is shown. In this embodiment, an exemplar database 304 stores fingerprints from messages in a message exemplar store 308. An e-mail message is broken down by finding one or more anchors in the visible text portions of the body of the e-mail. A predetermined number of characters before the anchor are processed to produce a code or an exemplar indicative of the predetermined number of characters. The predetermined number of characters could have a hash function, a checksum or a cyclic redundancy check performed upon it to produce the exemplar. The exemplar along with any others for the message is stored as a fingerprint for that message. Any textual communication can be processed in this way to get a fingerprint. For example, chat room comments, instant messages, newsgroup postings, electronic forum postings, message board postings, and classified advertisement could be processed for fingerprints to allow determining duplicate submissions.

Figure 3B:
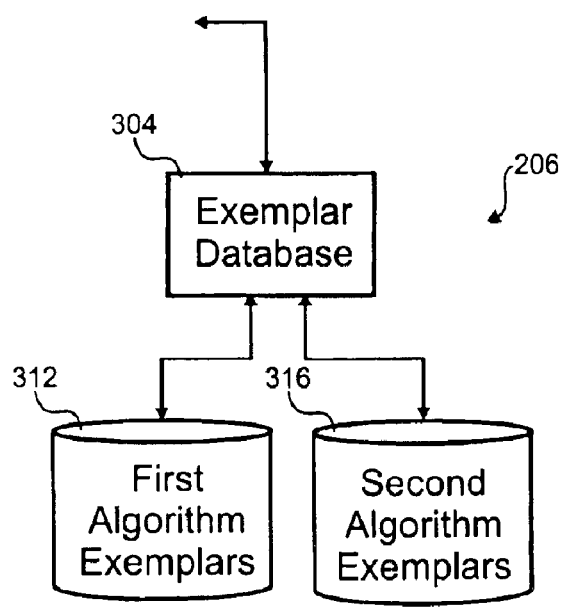
FIG. 3B is a block diagram of another embodiment of a message database.

With reference to FIG. 3B, a block diagram of another embodiment of a message database 206 is shown. This embodiment stores two fingerprints for each message. In a first algorithm exemplar store 312, fingerprints generated with a first algorithm are stored and fingerprints generated with a second algorithm are stored in a second algorithm exemplar store 316. Different algorithms could be more or less effective for different types of messages such that the two algorithms are more likely to detect a match than one algorithm working alone, The exemplar database 304 indicates to the mail transfer agent 204 which stores 312, 316 have matching fingerprints for a message. Some or all of the store 312, 316 may require matching a message fingerprint before a match is determined likely.

Other embodiments, could presort the messages such that only the first or second algorithm is applied such that only one fingerprint is in the stores 312, 316 for each message. For example, RTML-based e-mail could use the first algorithm and text-based e-mail could use the second algorithm. The exemplar database 304 would only perform one algorithm on a message where the algorithm would be determined based upon whether the message was HTML- or text-based.

Figure 3C:
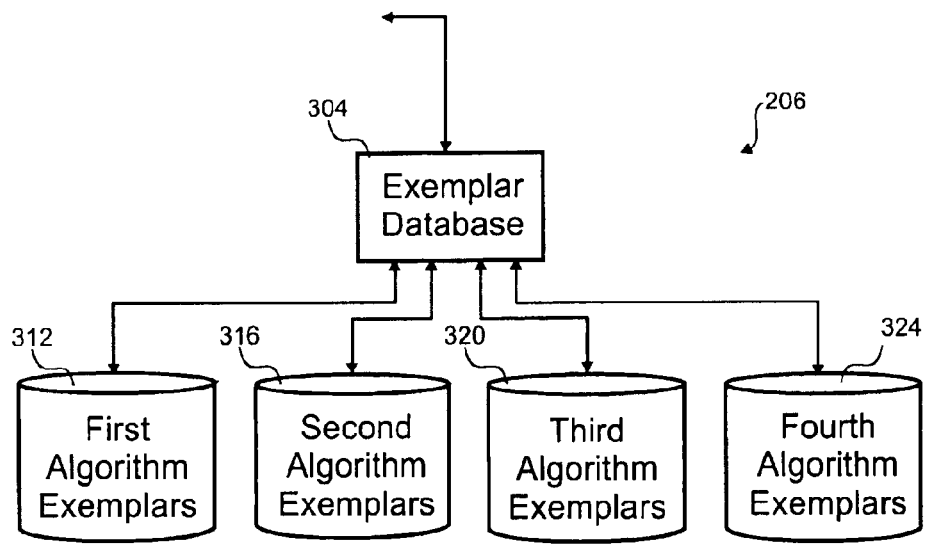
FIG. 3C is a block diagram of yet another embodiment of a message database.

Referring next to FIG. 3C, a block diagram of yet another embodiment of a message database 206 is shown. This embodiment uses four different algorithms. The messages may have all algorithms applied or a subset of the algorithms applied to generate one or more fingerprints. Where more than one algorithm is applied to a message, some or all of the resulting fingerprints require matching to determine a message is probably the same as a previously processed message. For example, fingerprints for a message using all algorithms. When half or more of the fingerprints match previously stored fingerprints for another message a likely match is determined.

Figure 3D:
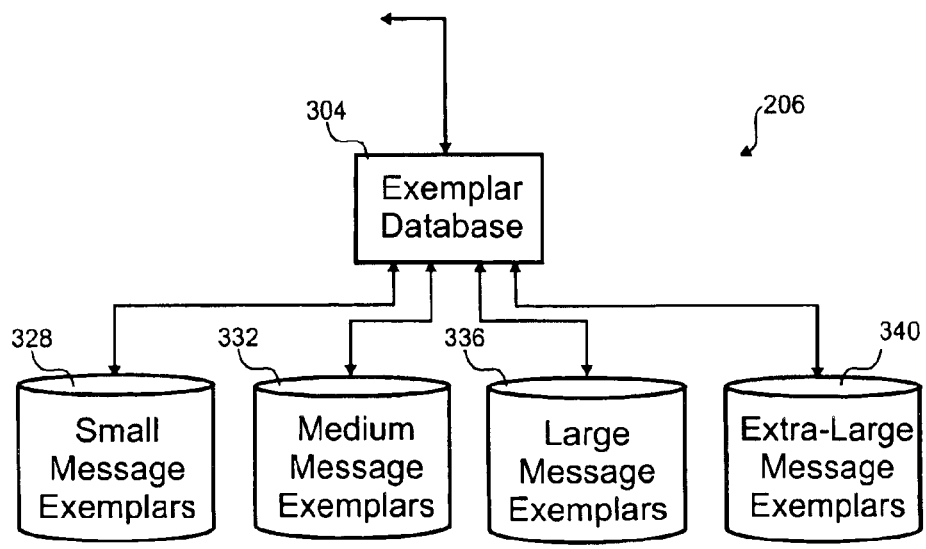
FIG. 3D is a block diagram of still another embodiment of a message database.

With reference to FIG. 3D, a block diagram of still another embodiment of a message database 206 is shown.

This embodiment presorts messages based upon their size. Four different algorithms tailored to the different sizes are used to produce a single fingerprint for each message. Each fingerprint is comprised of two or more codes or exemplars. The fingerprint is stored in one of a small message exemplars store 328, a medium message exemplars store 332, a large message exemplars store 336 and a extra-large message exemplars store 340. For example, a small message is only processed by a small message algorithm to produce a fingerprint stored in the small message exemplars store 328. Subsequent small messages are checked against the small message exemplars store 328 to determine if there is a match based upon similar or exactly matching fingerprints.

Figure 3E:
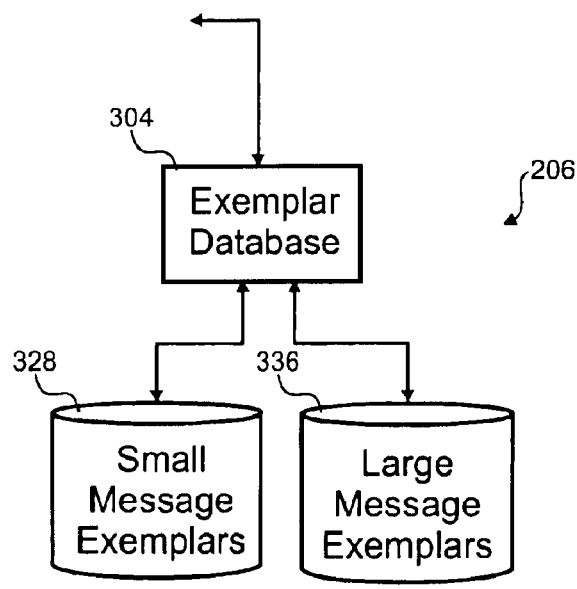
FIG. 3E is a block diagram of yet another embodiment of a message database.

Referring next to FIG. 3E, a block diagram of yet another embodiment of a message database 206 is shown. This embodiment uses two exemplar stores 328, 336 instead of the four of FIG. 3D, but otherwise behaves the same.

Figure 3F:
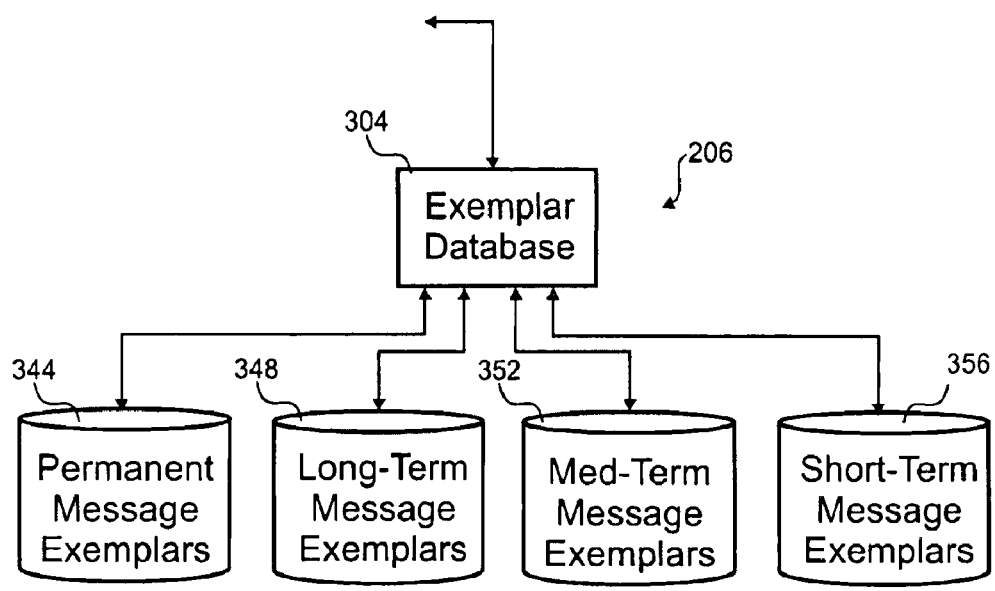
FIG. 3F is a block diagram of still another embodiment of a message database.

With reference to FIG. 3F, a block diagram of still another embodiment of a message database 206 is shown. This embodiment uses a single algorithm, but divides the fingerprints among four stores 344, 348, 352, 356 based upon the period between messages with similar fingerprints. A short-term message exemplars store (SMES) 356 holds fingerprints for the most recently encountered messages, a medium-tern message exemplars store (MMES) 352 holds fingerprints for less recently encountered messages, a long-term message exemplars store (MMES) 348 holds fingerprints for even less recently encountered messages, and a permanent message exemplars store (PMES) 344 holds fingerprints for the remainder of the messages.

After a fingerprint is derived for a message, that fingerprint is first checked against the SMES 356, the MMES 352 next, the LMES 348 next, and finally the PMES 344 for any matches. Although, other embodiments could perform the checks in the reverse order. If any store 344, 348, 352, 356 is determined to have a match, the cumulative count is incremented and the fingerprint is moved to the STME 356.

If any store 344, 348, 352, 356 becomes full, the oldest fingerprint is pushed off the store 344, 348, 352, 356 to make room for the next fingerprint. Any fingerprints pushed to the PMES 344 will remain there until a match is found or the PMES is partially purged to remove old fingerprints.

The stores 344, 348, 352, 356 may correspond to different types of memory. For example, the SMES 356 could be solid-state memory that is very quick, the MMES 352 could be local magnetic storage, the LMES 348 could be optical storage, and the PMES 344 could be storage located over the Internet. Typically, most of the message fingerprints are found in the SMES 356, less are found in the MMES 352, even less are found in the LMES 348, and the least are found in the PMBS 344. But, the SMES 356 is smaller than the MMES 352 which is smaller than the LMES 348 which is smaller than the PMES 344 in this embodiment.

Figure 3G:
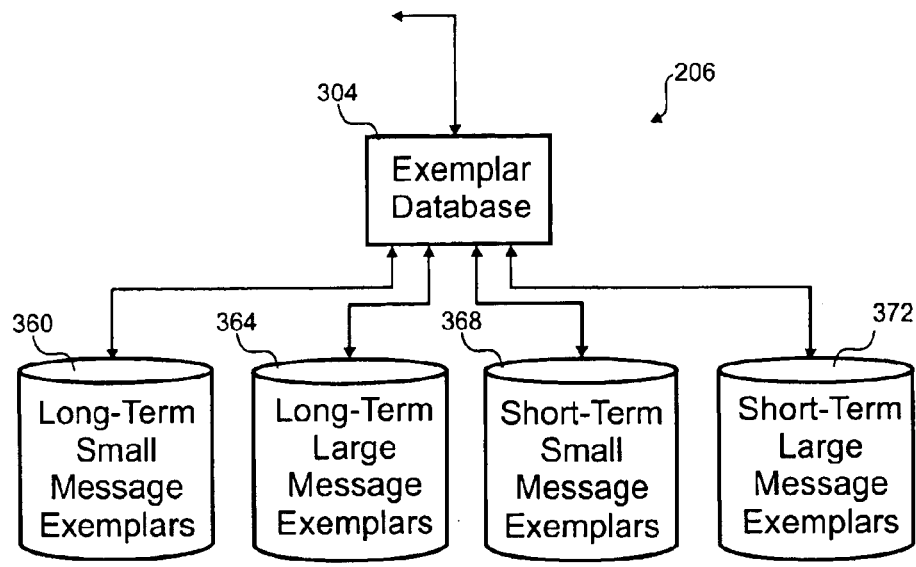
FIG. 3G is a block diagram of yet another embodiment of a message database.

Referring next to FIG. 3G, a block diagram of yet another embodiment of a message database 206 is shown. This embodiment uses two algorithms corresponding to long and short messages and has two stores for each algorithm divided by period of matches. Included in the message database 206 are a short-term small message exemplars (STSME) store 368, a short-term large message exemplars (STLME) store 372, a long-term small message exemplars (LTSME) store 360, and a long-term large message exemplars (LTLME) store 364.

The two short-term message exemplars stores 368, 372 store approximately the most recent two hours of messages in this embodiment. If messages that are similar to each other are received by the short-term message exemplars stores 368, 372 in sufficient quantity, the message is moved to the long-term message exemplars stores 360, 364. The long-term message stores 360, 364 retain a message entry until no similar messages are received in a thirty-six hour period in this embodiment. There are two stores for each of the short-term stores 368, 372 and the long-term stores 360, 364 because there are different algorithms that produce different exemplars for long messages and short messages.

Figure 3H:
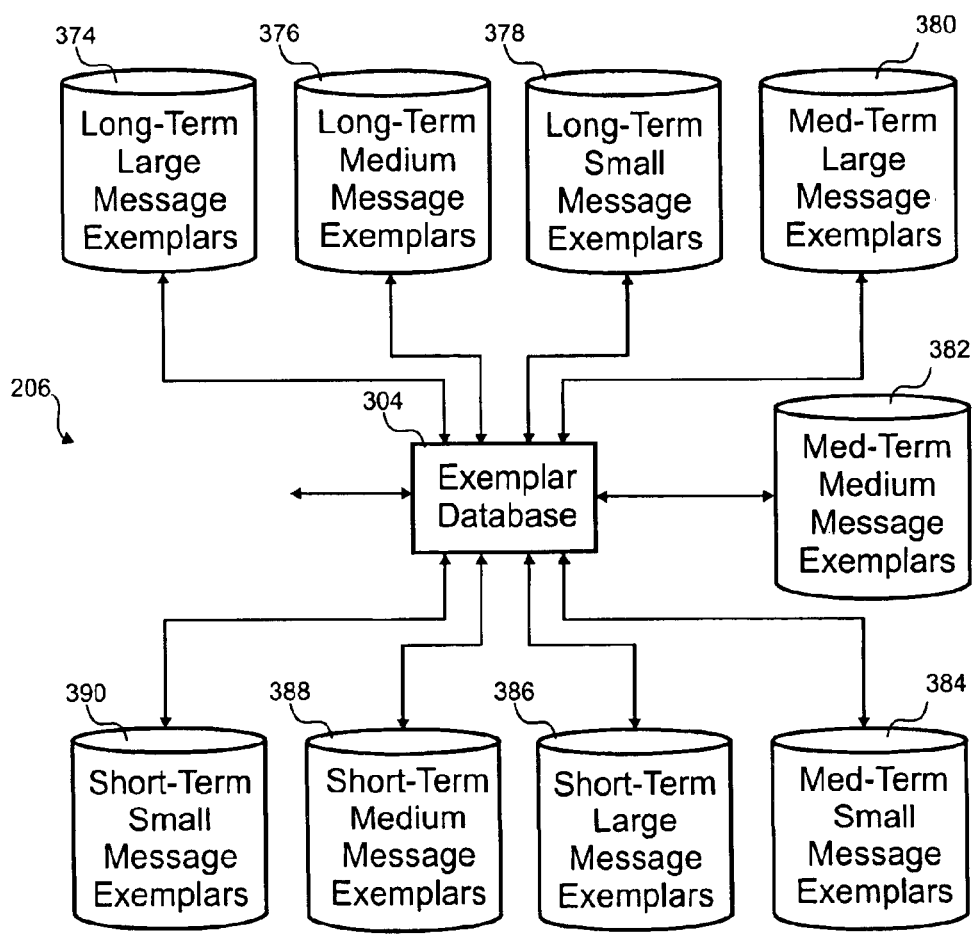
FIG. 3H is a block diagram of still another embodiment of a message database.

Referring next to FIG. 3H, a block diagram of still another embodiment of a message database 206 is shown. In this embodiment three algorithms are used based upon the size of the message. Additionally, the period of encounter is divided among three periods for each algorithm to provide for nine stores. Although this embodiment chooses between algorithms based upon size, other embodiments could choose between other algorithms based upon some other criteria. Additionally, any number of algorithms and/or period distinctions could be used in various embodiments.

Figure 4:
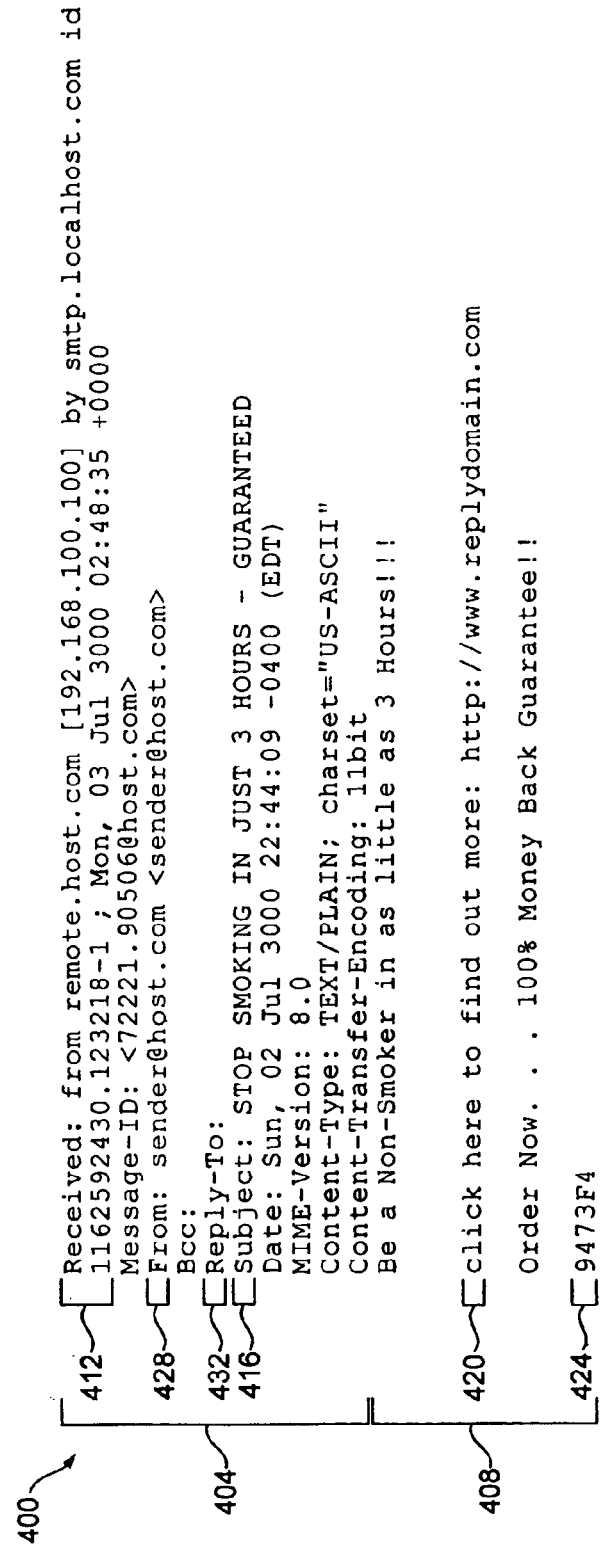
FIG. 4 is an embodiment of an unsolicited e-mail message exhibiting techniques used by unsolicited mailers.

Referring next to FIG. 4, an embodiment of an unsolicited e-mail message 400 is shown that exhibits some techniques used by unsolicited mailers 104. The message 400 is subdivided into a header 404 and a body 408. The message header includes routing information 412, a subject 416, the sending party 428 and other information. The routing information 412 along with the referenced sending party are often inaccurate in an attempt by the unsolicited mailer 104 to avoid blocking a mail system 112 from blocking unsolicited messages from that source. Included in the body 408 of the message is the information the unsolicited mailer 104 wishes the user 116 to read. Typically, there is a URL 420 or other mechanism for contacting the unsolicited mailer 104 in the body of the message in case the message presents something the user is interested in. To thwart an exact comparison of message bodies 408 to detect unsolicited e-mail, an evolving code 424 is often included in the body 408.

Figure 5A:
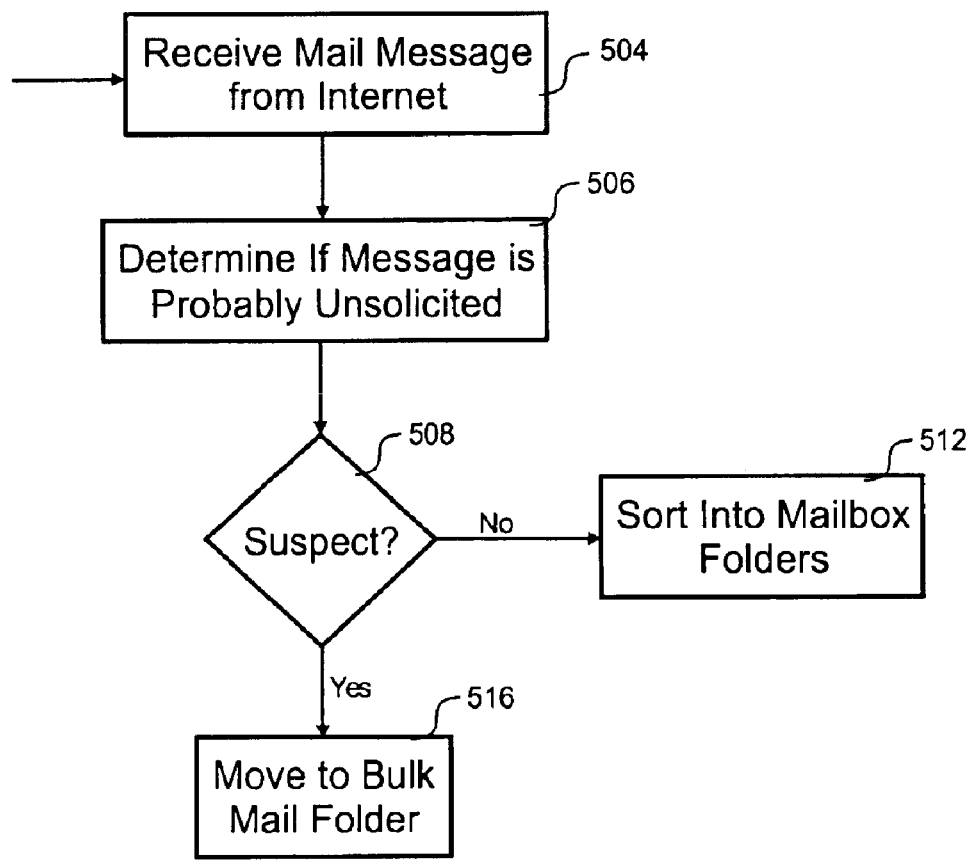
FIG. 5A is a flow diagram of an embodiment of a message processing method.

With reference to FIG. 5A, a flow diagram of an embodiment of a message processing method is shown. This simplified flow diagram processes an incoming message to determine if it is probably unsolicited and sorts the message accordingly. The process begins in step 504 where the mail message is retrieved from the Internet. A determination is made in step 506 if the message is probably unsolicited and suspect. In step 508, suspect messages are sent to a bulk mail folder in step 516 and other messages are sorted normally into the user's mailbox in step 512.

Figure 5B:
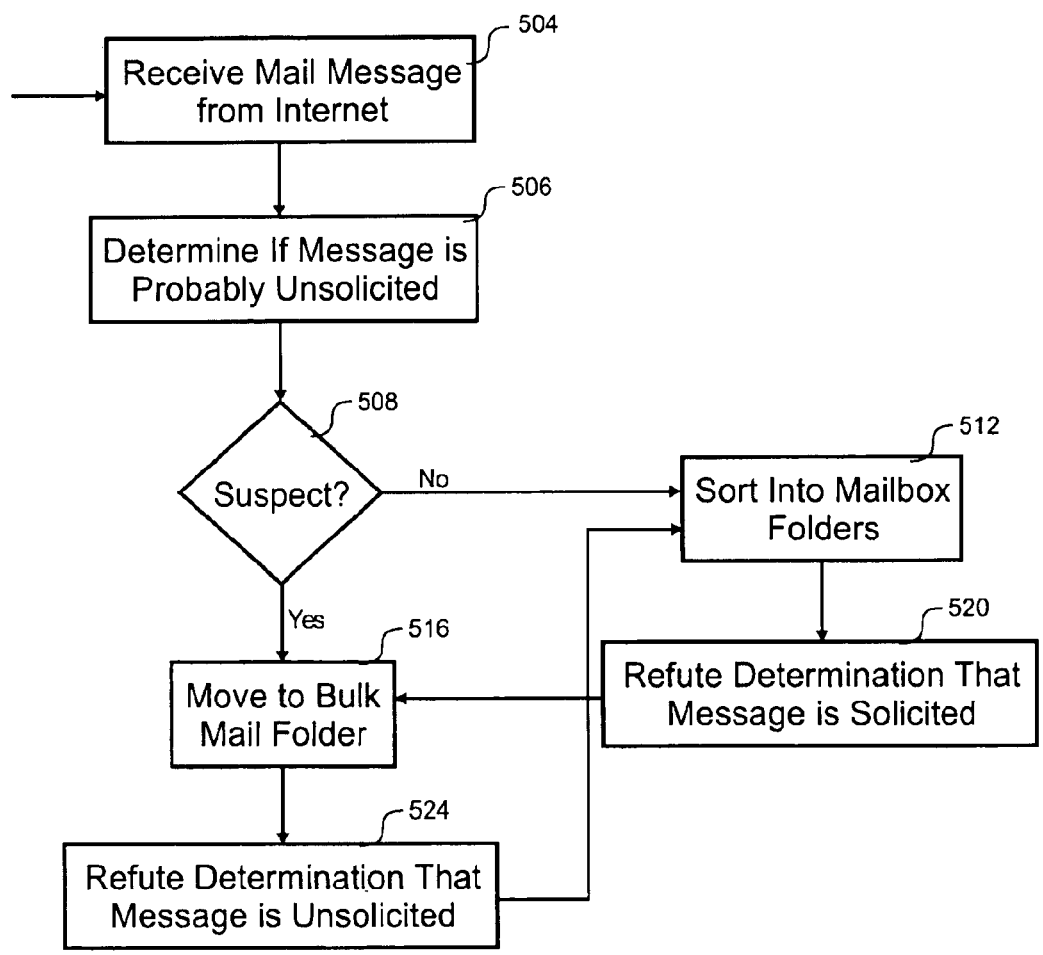
FIG. 5B is a flow diagram of another embodiment of a message processing method.

Referring next to FIG. 5B, a flow diagram of another embodiment of a message processing method is shown. This embodiment adds steps 520 and 524 to the embodiment of FIG. 5A. Picking-up where we left off on FIG. 5A, mail moved to the bulk mail folder can be later refuted in step 524 and sorted into the mailbox normally in step 512. Under some circumstances a bulk mailing will first be presumed unsolicited. If enough users complain that the presumption is incorrect, the mail system 112 will remove the message from the bulk folder for each user. If some unsolicited e-mail not sorted into the bulk mail folder and it is later determined to be unsolicited, the message is resorted into the bulk mail folder for all users. If the message has been viewed, the message is not resorted in this embodiment. Some embodiments could flag the message as being miscategorized rather than moving it.

Figure 5C:
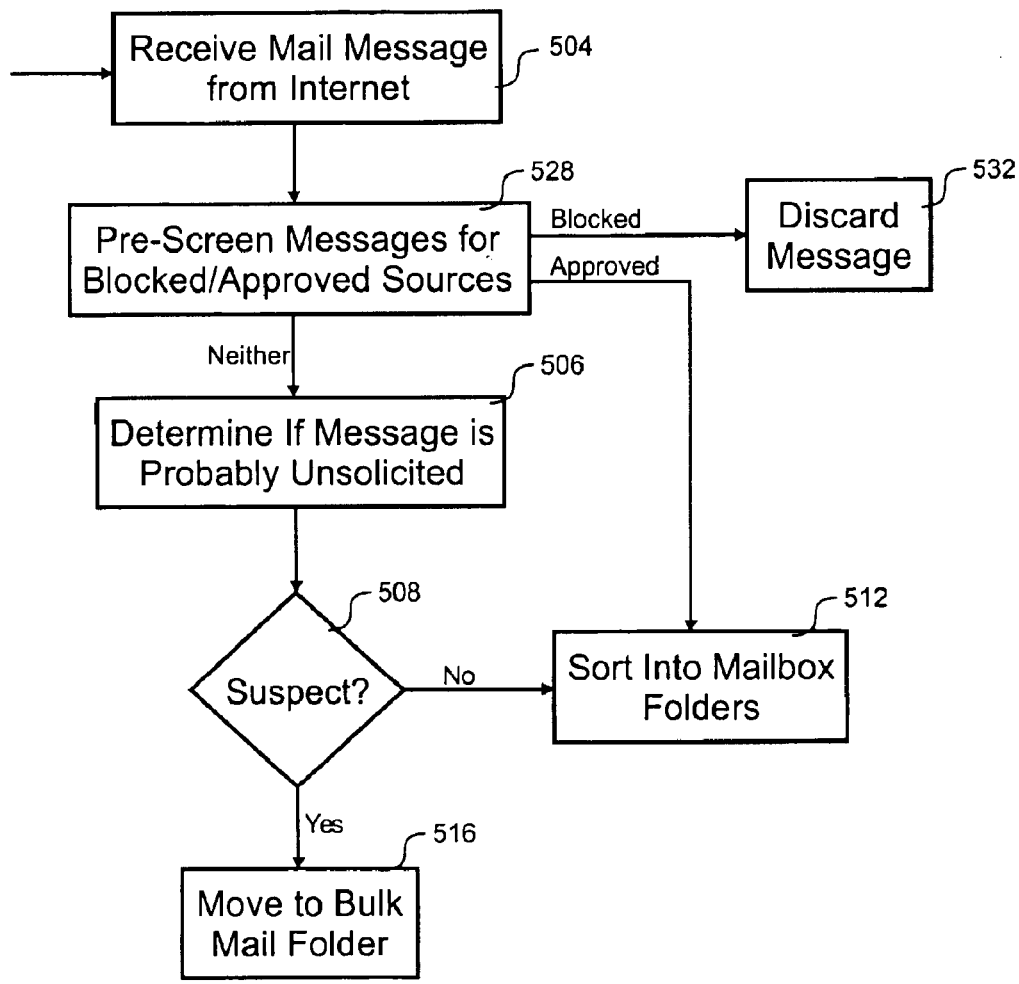
FIG. 5C is a flow diagram of yet another embodiment of a message processing method.

With reference to FIG. 5C, a flow diagram of yet another embodiment of a message processing method is shown. This embodiment differs from the embodiment of FIG. 5A by adding steps 528 and 532. Once a connection is made with the Internet to receive a message, a determination is made to see if the message is from a blocked or approved IP address. This determination is made at the protocol level and does not involve the message header that may be forged. Blocked and approved addresses are respectively stored in the block list 244 and the approved list 216. Messages from blocked IP addresses are not received by the mail system and messages from approved IP addresses are sorted into the mailbox in step 512 without further scrutiny.

Figure 5D:
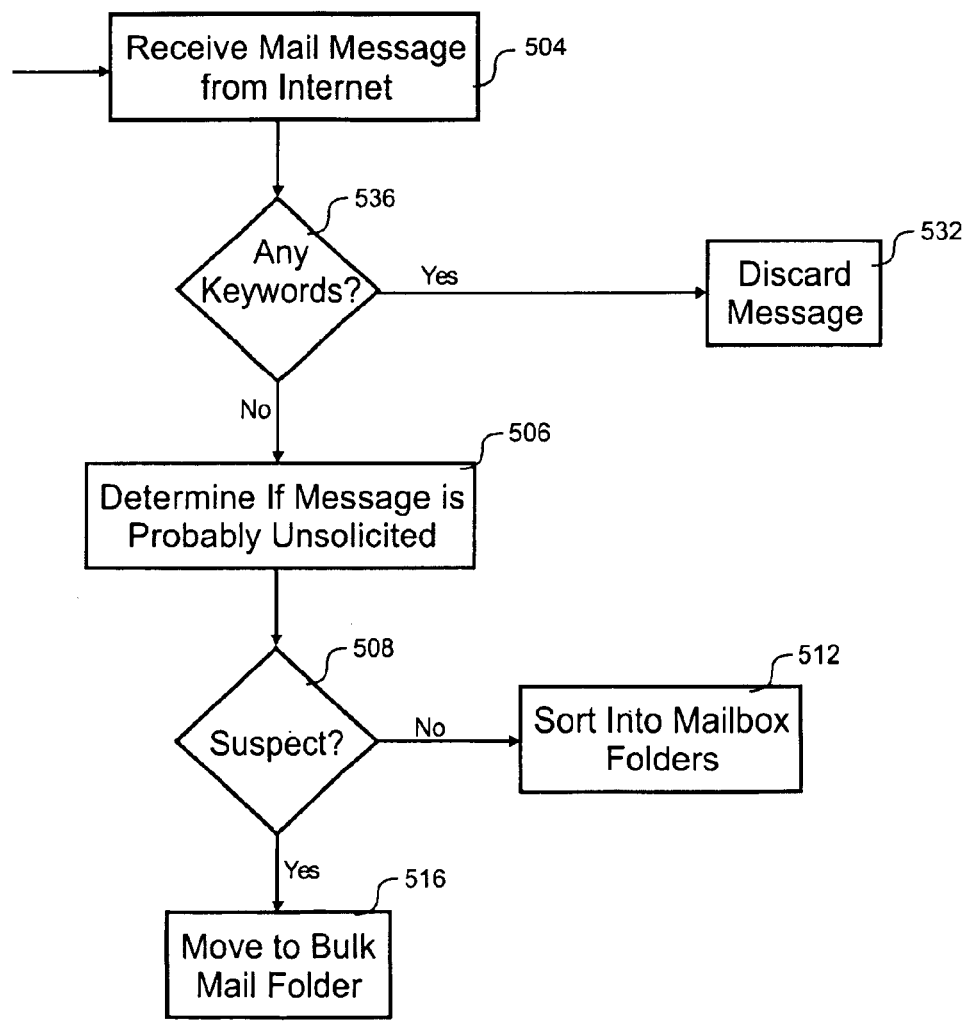
FIG. 5D is a flow diagram of still another embodiment of a message processing method.

Referring next to FIG. 5D, a flow diagram of still another embodiment of a message processing method is shown. This embodiment adds to the embodiment of FIG. 5A the ability to perform keyword checking on incoming messages. Keywords are typically URLs, phone numbers and other words or short phrases that uniquely identify that the message originated from an unsolicited mailer 104. As the mail transfer agent 204 reads each word from the message, any keyword encountered will cause receiving of the message to end such that the message is discarded.

Figure 5E:
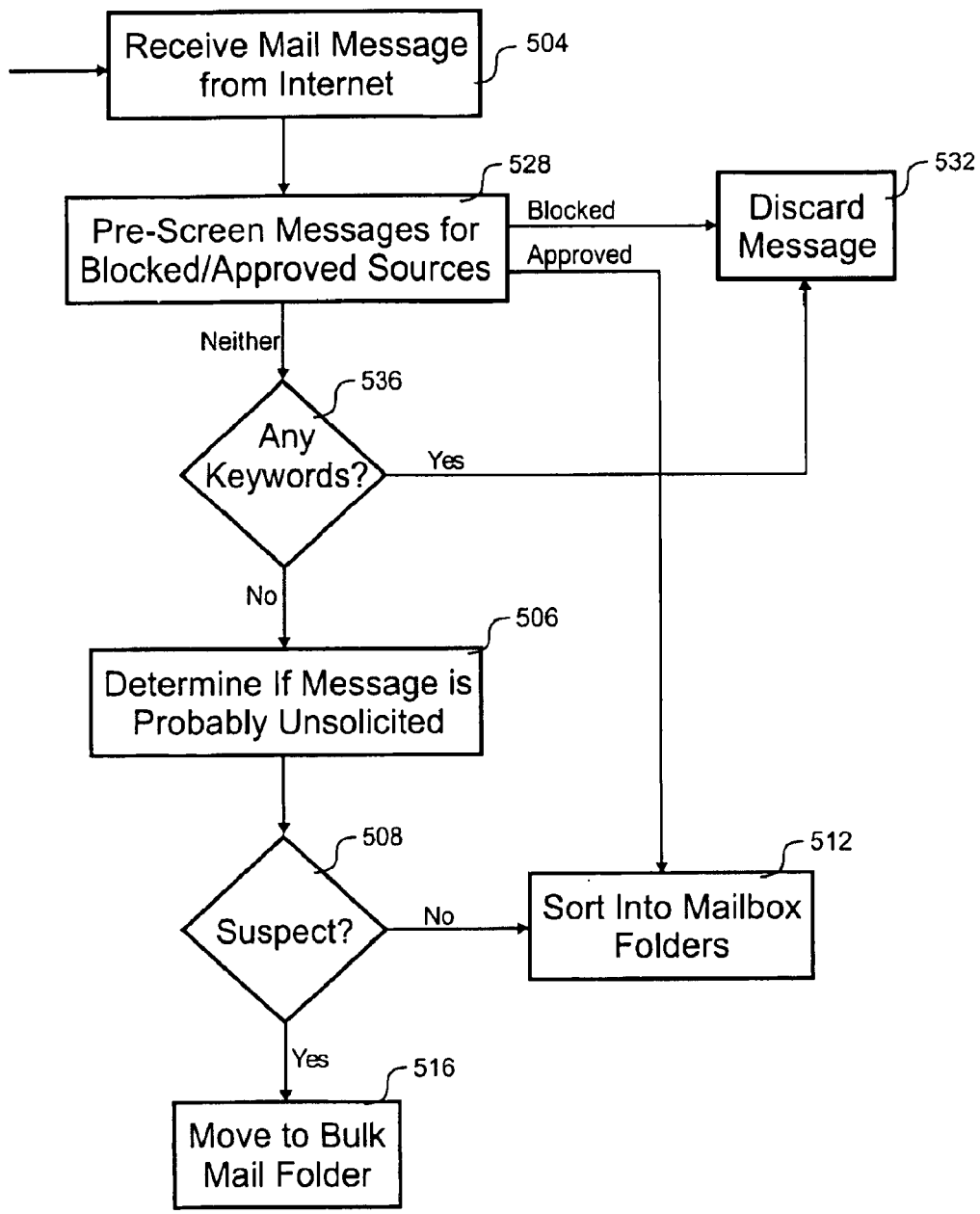
FIG. 5E is a flow diagram of yet another embodiment of a message processing method.

With reference to FIG. 5E, a flow diagram of yet another embodiment of a message processing method is shown. This embodiment uses the prescreening and keyword checking first described in relation to FIGS. 5C and 5D above. Either a blocked e-mail address or a keyword will stop the download of the message from the source. Conversely, an approved source IP address will cause the message to be sorted into the mailbox of the user without further scrutiny. Some embodiments could either produce an error message that is sent to the source relay to indicate the message was not received. Alternatively, an error message that implies the e-mail address is no longer valid could be used in an attempt to get the unsolicited mailer or list broker to remove the e-mail address from their distribution list.

Figure 6A:
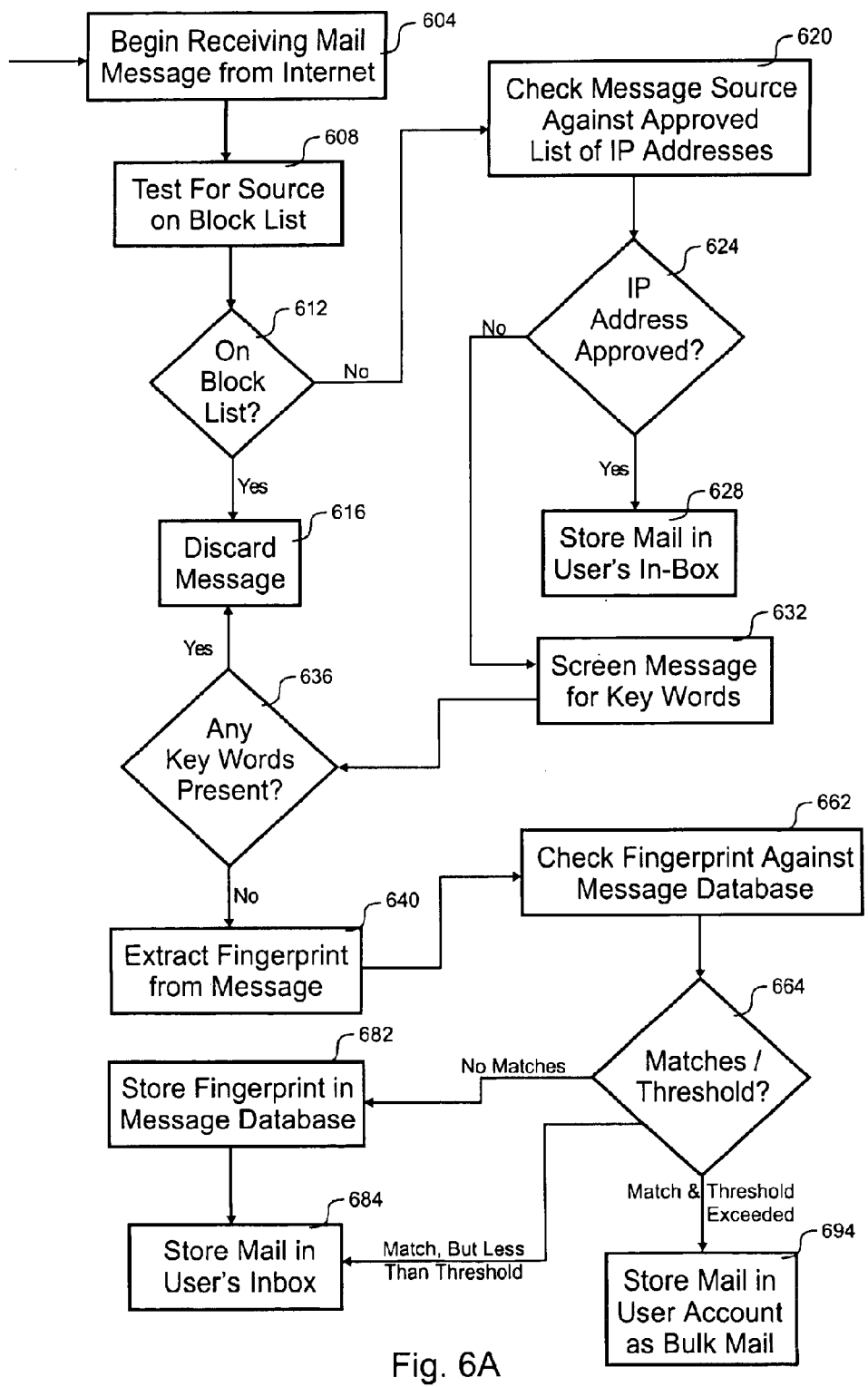
FIG. 6A is a first portion of a flow diagram of an embodiment of an e-mail processing method.

With reference to FIG. 6A, a flow diagram of an embodiment of an e-mail processing method is depicted. The process starts in step 604 where the mail transfer agent 204 begins to receive the e-mail message 400 from the Internet 108. This begins with a protocol level handshake where the relay sending the message 400 provides its IP address. In step 608, a test is performed to determine if the source of the e-mail message 400 is on the block list 244. If the source of the message is on the block list 244 as determined in step 612, the communication is dropped in step 616 and the e-mail message 400 is never received. Alternatively, processing continues to step 620 if the message source is not on the block list 244.

Figure 5F:
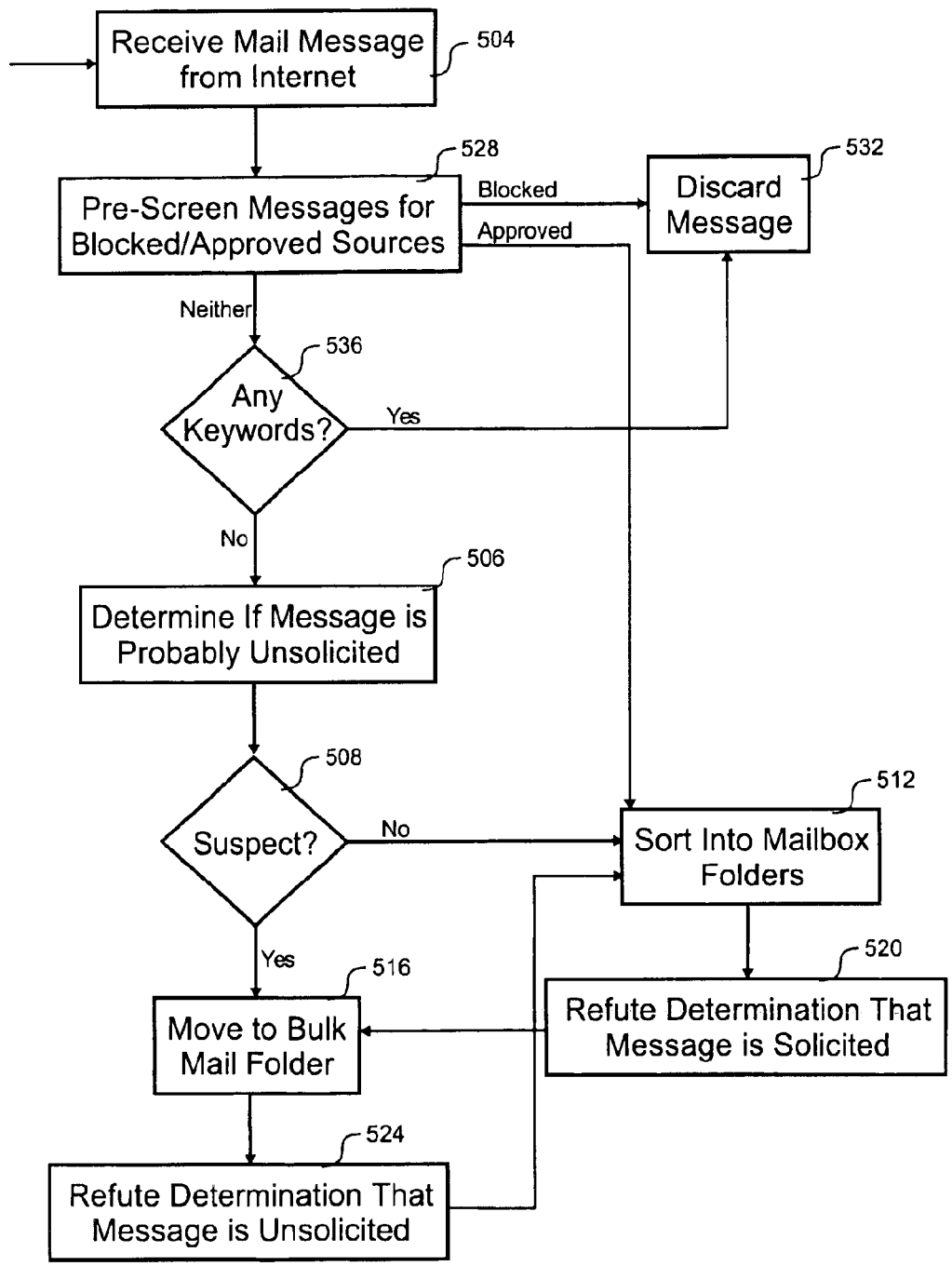
FIG. 5F is a flow diagram of yet another embodiment of a message processing method.

Referring next to FIG. 5F, an embodiment of a message processing method is shown. This embodiment is a hybrid of the methods in FIGS. 5B and 5E where steps 520 and 524 from FIG. 5B are added to FIG. 5E to create FIG. 5F. After step 512 in FIG. 5F, the determination that the message is solicited can be refuted in step 520 before processing proceeds to step 516. After step 516, the determination that the message is unsolicited can be refuted in step 524 before processing continues back to step 512.

E-mail messages 400 from certain "approved" sources are accepted without further investigation. Each message is checked to determine if it was sent from an IP addresses on the approved list 216 in steps 620 and 624. The IP addresses on the approved list 216 correspond to legitimate senders of e-mail messages in bulk. Legitimate senders of e-mail messages are generally those that have previous relationships with a user 116 where the user assents to receiving the e-mail broadcast. If the IP address is on the approved list 216, the message is stored in the mail account of the user 116.

If the source of the message 400 is not on the approved list 216, further processing occurs to determine if the message 400 was unsolicited. In step 632, the message body 408 is screened for key words 230 as the message is received. The key words 230 are strings of characters that uniquely identify a message 400 as belonging to an unsolicited mailer 104 and may include a URL 420, a phone number or an e-mail address. If any key words are present in the message body 408, the message 400 is discarded in step 616 without receiving further portions.

To determine if the e-mail message 400 has been sent a number of times over a given time period, an algorithm is used to determine if the e-mail message 400 is similar to others received over some time period in the past. In this embodiment, the algorithm does not require exact matches of the fingerprints. In step 640, a fingerprint is produced from the message body 408. Embodiments that use multiple algorithms on each message generate multiple fingerprints in step 640. The fingerprint is checked against the message database 206 in step 662. As discussed above, multiple algorithms could be used in step 662 to determine if the multiple fingerprints for the message matches any of the stores.

If a match is determined in step 664 and a threshold amount of matching messages is received over a given time period, the message is sent to the bulk mail folder for the user in step 694. If there is no match, the fingerprint for the message is added to the store(s) in step 682. As a third alternative outcome, the message is stored in the user's mailbox in step 684 without adding a new fingerprint to the database when there is a match, but the threshold is not exceeded. Under these circumstances, a count for the fingerprint is incremented.

Figure 6B:
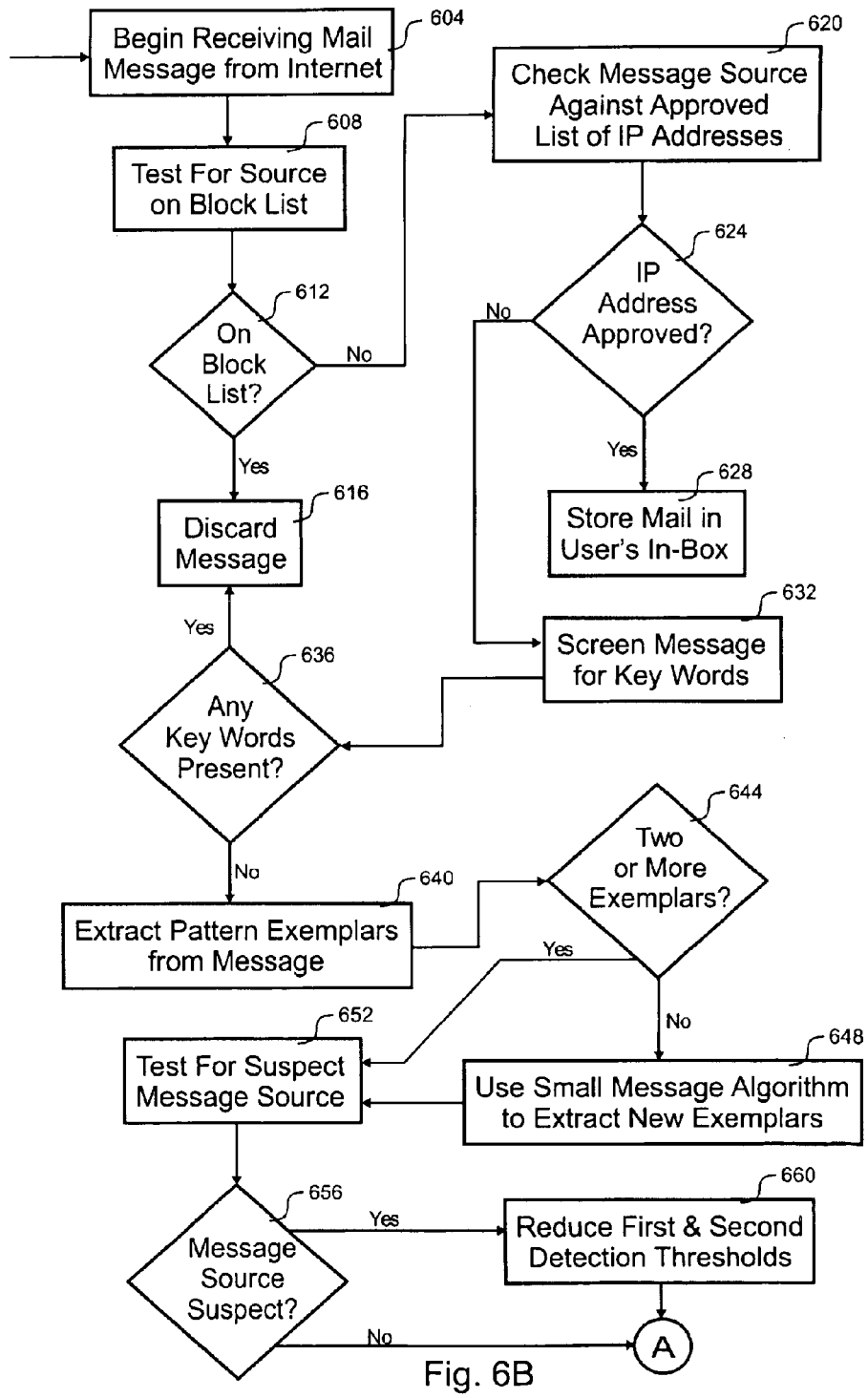
FIG. 6B is an embodiment of a second portion of the embodiment of FIG. 6A.
Figure 6C:
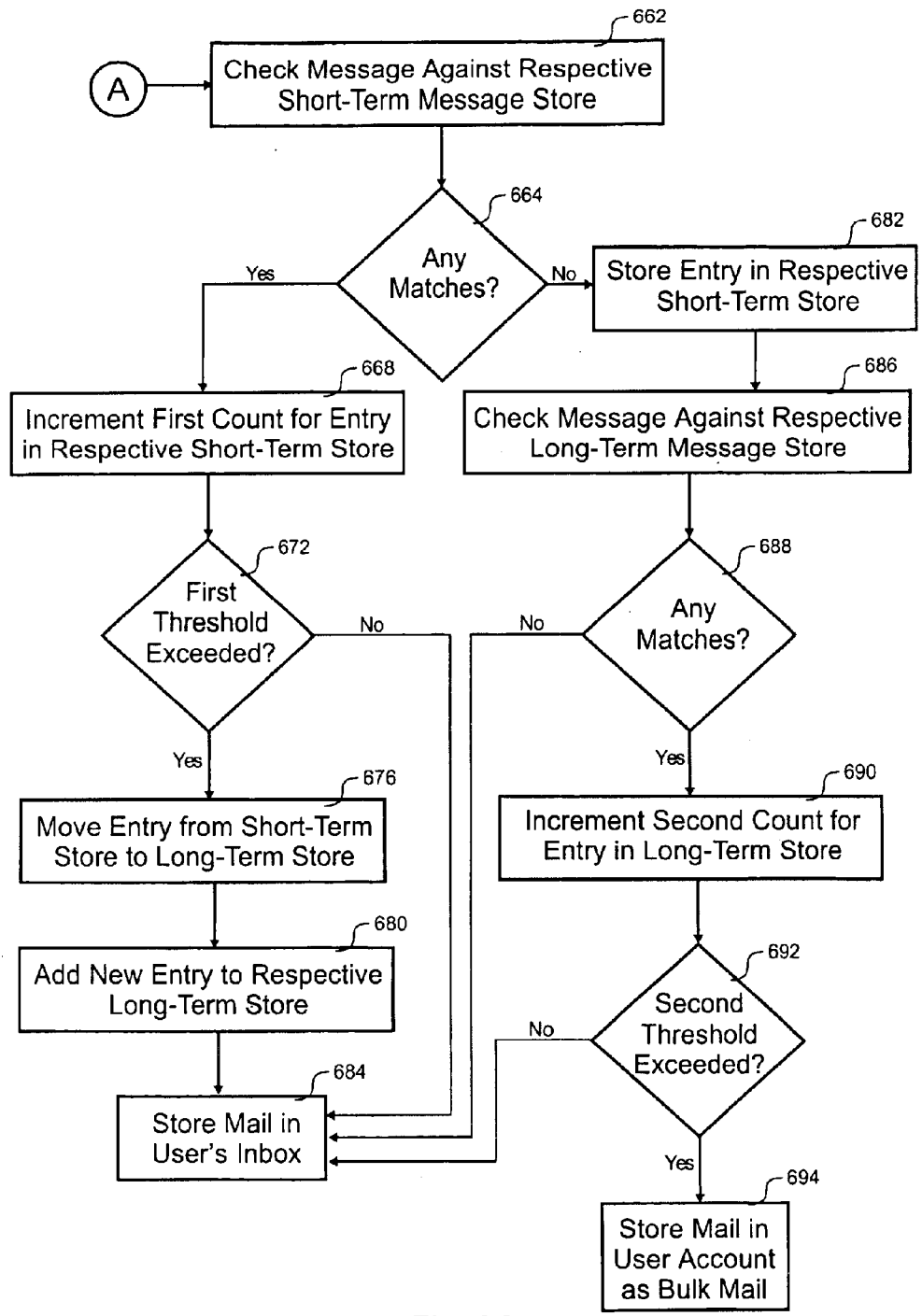
FIG. 6C is another embodiment of a second portion of the embodiment of FIG. 6A.
Figure 6D:
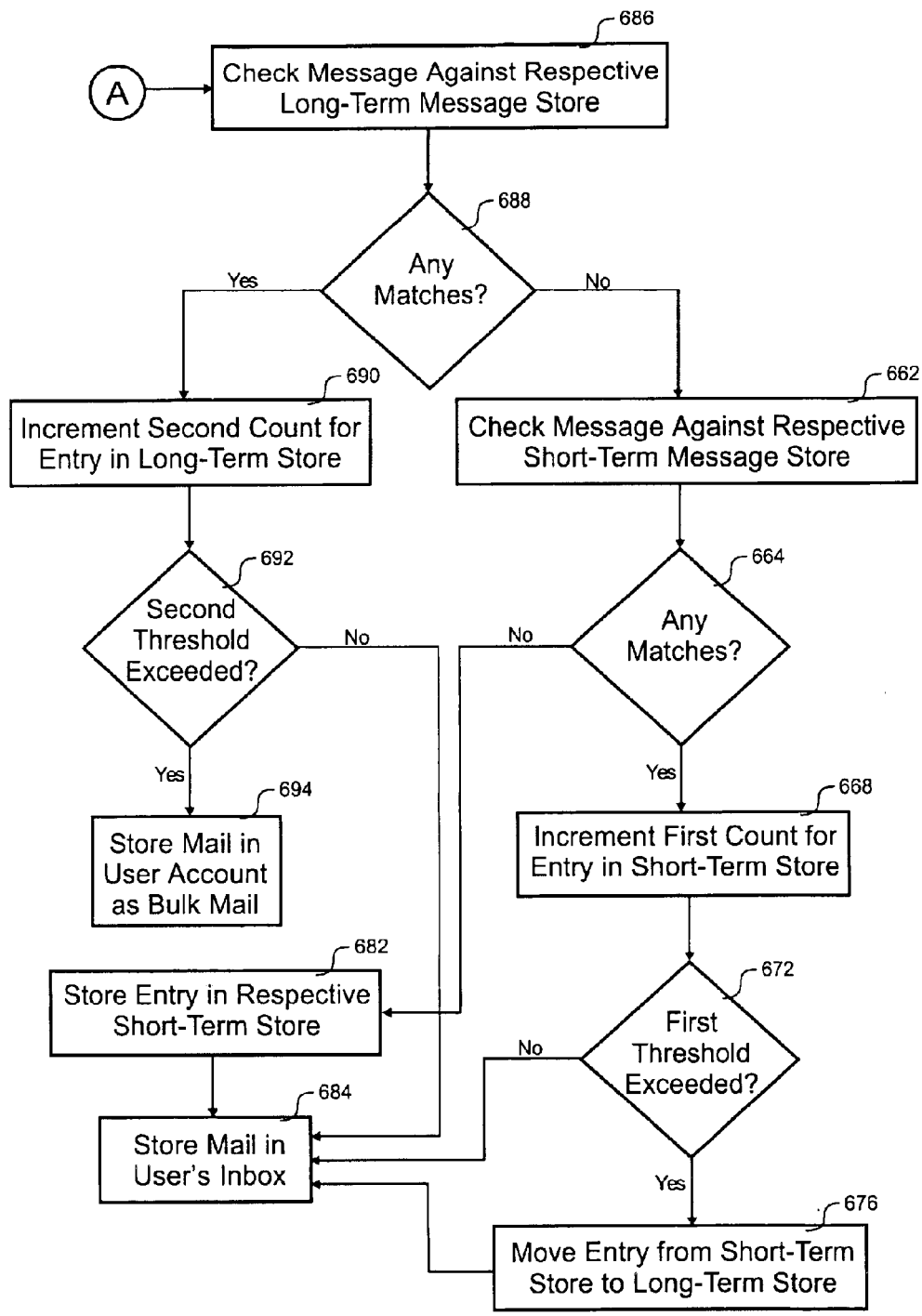
FIG. 6D is yet another embodiment of a second portion of the embodiment of FIG. 6A.

With reference to FIGS. 6B and 6C, a flow diagram of an embodiment of an e-mail processing method is depicted. FIG. 6D is not part of this embodiment. The process starts in step 604 where the mail transfer agent 204 begins to receive the e-mail message 400 from the Internet 108. This begins with a protocol level handshake where the relay sending the message 400 provides its IP address. In step 608, a test is performed to determine if the source of the e-mail message 400 is on the block list 244. If the source of the message is on the block list 244 as determined in step 612, the communication is dropped in step 616 and the e-mail message 400 is never received. Alternatively, processing continues to step 620 if the message source is not on the block list 244.

E-mail messages 400 from certain sources are accepted without further investigation. Each message is checked to determine if it was sent from an IP addresses on the approved list 216 in steps 620 and 624. The IP addresses on the approved list 216 correspond to legitimate senders of e-mail messages in bulk. Legitimate senders of e-mail messages are generally those that have previous relationships with a user 116 where the user assents to receiving the e-mail broadcast. If the IP address is on the approved list 216, the message is stored in the mail account of the user 116 in step 628.

Further processing occurs to determine if the message 400 was unsolicited if the source of the message 400 is not on the approved list 216. In step 632, the message body 408 is screened for key words 230. The key words 230 are strings of characters that uniquely identify a message 400 as belonging to an unsolicited mailer 104 and may include a URL 420, a phone number or an e-mail address. If any key words are present in the message body 408, the message 400 is discarded in step 616 without further processing.

To determine if the e-mail message 400 has been sent a number of times, an algorithm is used to determine if the e-mail message 400 is similar to others received in the past. The algorithm does not require exact matches and only requires some of the exemplars that form a fingerprint to match. In step 640, exemplars are extracted from the message body 408 to form a fingerprint for the message 408. A determination is made in step 644 as to whether there are two or more exemplars harvested from the message body 408.

In this embodiment, more than two exemplars are considered sufficient to allow matching, but two or less is considered insufficient. When more exemplars are needed, a small message algorithm is used to extract a new set of exemplars to form the fingerprint in step 648. The small message algorithm increases the chances of accepting a string of characters for generating an exemplar upon. Future matching operations depend upon whether the exemplars were extracted using the small message or large message algorithm to generate those exemplars. The small message stores 368, 372 are used with the small message algorithm, and the large message stores 360, 364 are used with the large message algorithm.

The thresholds for detection of unsolicited e-mail are reduced when the message is received by the mail system 112 from an open relay. Open relays are often used by unsolicited mailers 104 to mask the IP address of the true origin of the e-mail message 400, among other reasons. By masking the true origin, the true origin that could identify the unsolicited mailer 104 is not readily ascertainable. However, the IP address of the relay that last sent the message to the mail system 112 can be accurately determined. The actual IP address of the last relay before the message 400 reaches the mail system 112 is known from the protocol-level handshake with that relay. The actual IP address is first checked against the local open relay list 220 for a match. If there is no match, the actual IP address is next checked against the remote open relay list 240 across the Internet 108. If either the local or remote open relay lists 220, 240 include the actual IP address, first and second detection threshold are reduced in step 660 as described further below. Table I shows four embodiments of how the first and second detection thresholds might be reduced. Other embodiments could use either the local or remote open relay list 220, 240.

TABLE I

| First Detection Threshold | | Second Detection Threshold | |
|---|---|---|---|
| Without | With Match | Without | With Match |
| 10 | 5 | 25 | 12 |
| 50 | 25 | 100 | 50 |
| 100 | 50 | 500 | 250 |
| 500 | 300 | 1000 | 600 |

Depending on whether the e-mail message 400 is a short or long message as determined in step 644, either the STSME store 368 or STLME store 372 is checked for a matching entry. The STSME and STLME stores 368, 372 hold the last two hours of message fingerprints, in this embodiment, along with a first count for each. The first count corresponds to the total number of times the mail transfer agents 204 have seen a similar message within a two hour period so long as the count does not exceed the first threshold.

A test for matches is performed in step 664. A match only requires a percentage of the exemplars in the fingerprint to match (e.g., 50%, 80%, 90%, or 100%). In this embodiment, a match is found when all of the exemplars of a fingerprint stored in the respective STSME or STLME store 368, 372 are found in the exemplars of the message currently being processed. Other embodiments could only require less than all of the exemplars in the respective STSME or STLME store 368, 372 are found in the message being processed. For example the other embodiment could require half of the exemplars to match.

If a match is determined in step 664 between the current e-mail message 400 and the respective STSME or STLME store 368, 372, processing continues to step 668 where a first count is incremented. The first count is compared to the first threshold in step 672. Depending on the determination in step 656, the first threshold may or may not be reduced. If the first threshold is not exceeded, processing continues to step 684 where the e-mail message 400 is stored in the user's inbox folder.

Alternatively, processing continues to step 676 if the first threshold is exceeded by the first count. The fingerprint of exemplars for the e-mail message 400 is moved from the short-term store 368, 372 to the respective long-term store 360, 364 in step 676. In step 680, the new fingerprint will replace the oldest fingerprint in the long-term store 360, 364 that has not been incremented in the last thirty-six hours. A fingerprint becomes stale after thirty-six hours without any change in count, in this embodiment. If there is no stale entry, the new fingerprint is added to the store 360, 364 and an index that points to the fingerprint is added to the beginning of a list of indexes such that the freshest or least stale fingerprint indexes are at the beginning of the index list of the long-term store 360, 364. Once the fingerprint is added to appropriate the long-term store 360, 364, the e-mail message 400 is stored in the account of the user in step 684.

Returning back to step 664, processing continues to step 686 if there is not a match to the appropriate short-term message database 368, 372. In step 686, the message fingerprint is checked against the appropriate long-term message store 360, 364. Only a percentage (e.g., 50%, 80%, 90%, or 100%) of the exemplars need to exactly match an entry in the appropriate long-term message store 360, 364 to conclude that a match exists. The long-term message store 360, 364 used for this check is dictated by whether the long or short message algorithm is chosen back in step 644. If there is not a match determined in step 688, the e-mail message 400 is stored in the mailbox of the user in step 684. Otherwise, processing continues to step 690 where the second count for the fingerprint entry is incremented in the long-term store 360, 364. When the second count is incremented, the fingerprint entry is moved to the beginning of the long-term store 360, 364 such that the least stale entry is at the beginning of the store 360, 364.

In step 692, a determination is made to see if the e-mail message 400 is unsolicited. If the second threshold is exceeded, the e-mail message is deemed unsolicited. Depending on determination made in step 656 above, the second threshold is defined according to the embodiments of Table I. If the second threshold is exceeded, the e-mail message 400 is stored in the bulk mail folder of the user's account in step 694. Otherwise, the e-mail message 400 is stored in the inbox folder. In this way, the efforts of unsolicited mailers 104 are thwarted in a robust manner because similar messages are correlated to each other without requiring exact matches. The first and second thresholds along with the times used to hold fingerprints in the exemplar database 208 could be optimized in other embodiments.

With reference to FIGS. 6B and 6D, a flow diagram of another embodiment of an e-mail processing method is depicted. FIG. 6C is not a part of this embodiment. This embodiment checks long-term message exemplars store 360, 364 before short-term message-exemplars store 368, 372.

Figure 7A:
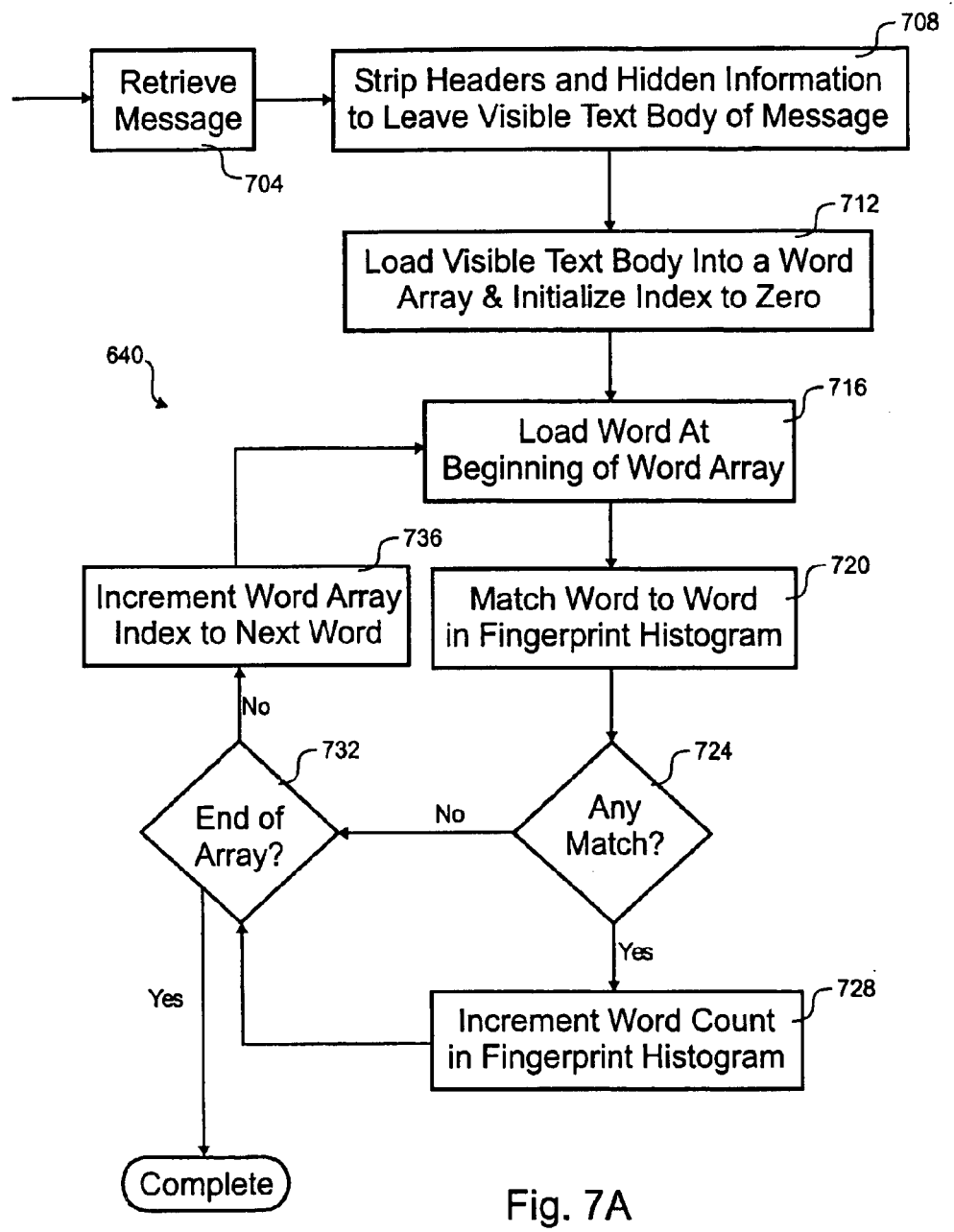
FIG. 7A is a flow diagram of an embodiment for producing a fingerprint for an e-mail message.

Referring next to FIG. 7A, a flow diagram 640 of another embodiment for producing a fingerprint for an e-mail message is shown. The process begins in step 704 where an e-mail message 400 is retrieved. Information such as headers or hidden information in the body 408 of the message 400 is removed to leave behind the visible body 408 of the message 400 in step 708. Hidden information is anything that is not visible to the user when reading the message such as white text on a white background or other HTML information. Such hidden information could potentially confuse processing of the message 400.

To facilitate processing, the visible text body is loaded into a word array in step 712. Each element in the word array has a word from the message body 408. The index of the word array is initialized to zero or the first word of the array. In step 716, the word located at the index is loaded. That word is matched against the possible words in a fingerprint histogram. The fingerprint histogram includes five hundred of the most common words used in unsolicited e-mail messages.

If a match is made to a word in the fingerprint histogram, the count for that word is incremented in step 728. Processing continues to step 732 after the increment. Returning to step 724 once again. If there is no match to the words in the histogram, processing also continues to step 732.

A determination is made in step 732 of whether the end of the word array has been reached. If the word array has been completely processed the fingerprint histogram is complete. Alternatively, processing continues to step 736 when there are more words in the array. In step 736, the word array index is incremented to the next element. Processing continues to step 716 where the word is loaded and checked in a loop until all words are processed.

In this way, a fingerprint histogram is produced that is indicative of the message. Matching of the fingerprint histograms could allow slight variance for some words so as to not require exactly matching messages.

Figure 7B:
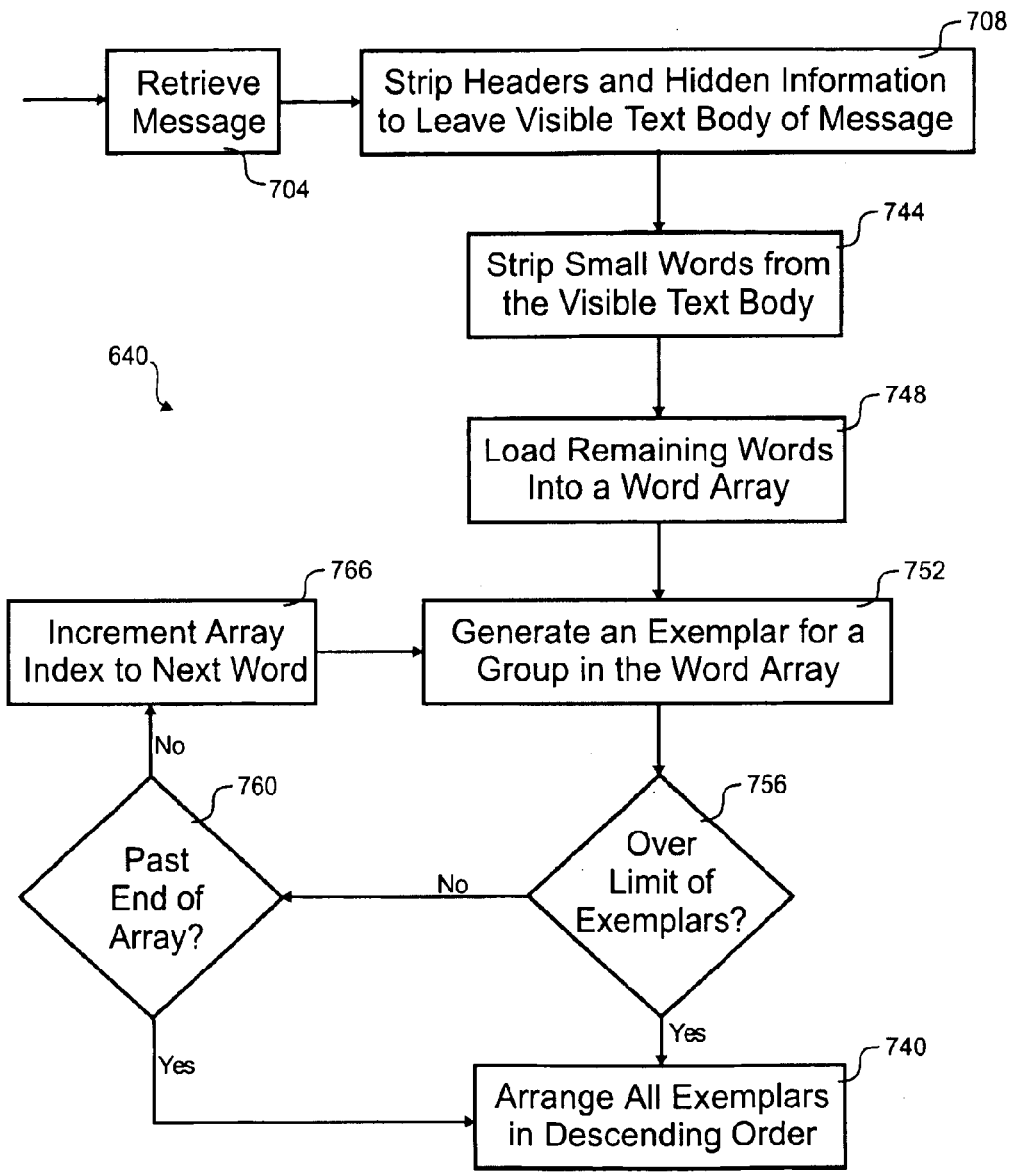
FIG. 7B is a flow diagram of another embodiment for producing a fingerprint for an e-mail message.

With reference to FIG. 7B, a flow diagram 640 of another embodiment for producing a fingerprint for an e-mail message is shown. The process begins in step 704 where an e-mail message 400 is retrieved. Information such as headers or hidden information in the body 408 of the message 400 is removed to leave behind the visible body 408 of the message 400 in step 708. In step 744, the small words are stripped from the visible text body such that only large words remain. The definition of what constitutes a small-word can be between four and seven characters. In this embodiment, a word of five characters or less is a small word.

In step 748, the remaining words left after removal of the small words are loaded into a word array. Each element of the word array contains a word from the message and is addressed by an index.

Groups of words from the word array are used to generate a code or exemplar in step 752. The exemplar is one of a hash function, a checksum or a cyclic redundancy check of the ASCII characters that comprise the group of words. The group of words could include from three to ten words. This embodiment uses five words at a time. Only a limited amount of exemplars are gathered from messages. If the maximum number of exemplars have been gathered, they are sorted into descending order as the fingerprint in step 740.

Presuming all the exemplars have not been gathered, processing continues to step 760 where it is determined if all the word groups have been processed. If processing is complete, the exemplars are sorted in descending order as the fingerprint in step 740. Otherwise, processing continues to step 766 where the array index is incremented to the next word. The next word is processed by looping back to step 752. This looping continues until either all word groups are processed or the maximum amount of exemplars is gathered.

Some embodiments could load the words into a character array and analyze a group of characters at a time. For example, a group of twenty characters at one time could be used to generate an exemplar before incrementing one character in the array. In other embodiments, exemplars for the whole message could be gathered. These exemplars would be reduced according to some masking algorithm until a limited number remained. This would avoid gathering the exemplars from only the beginning of a large message.

Figure 7C:
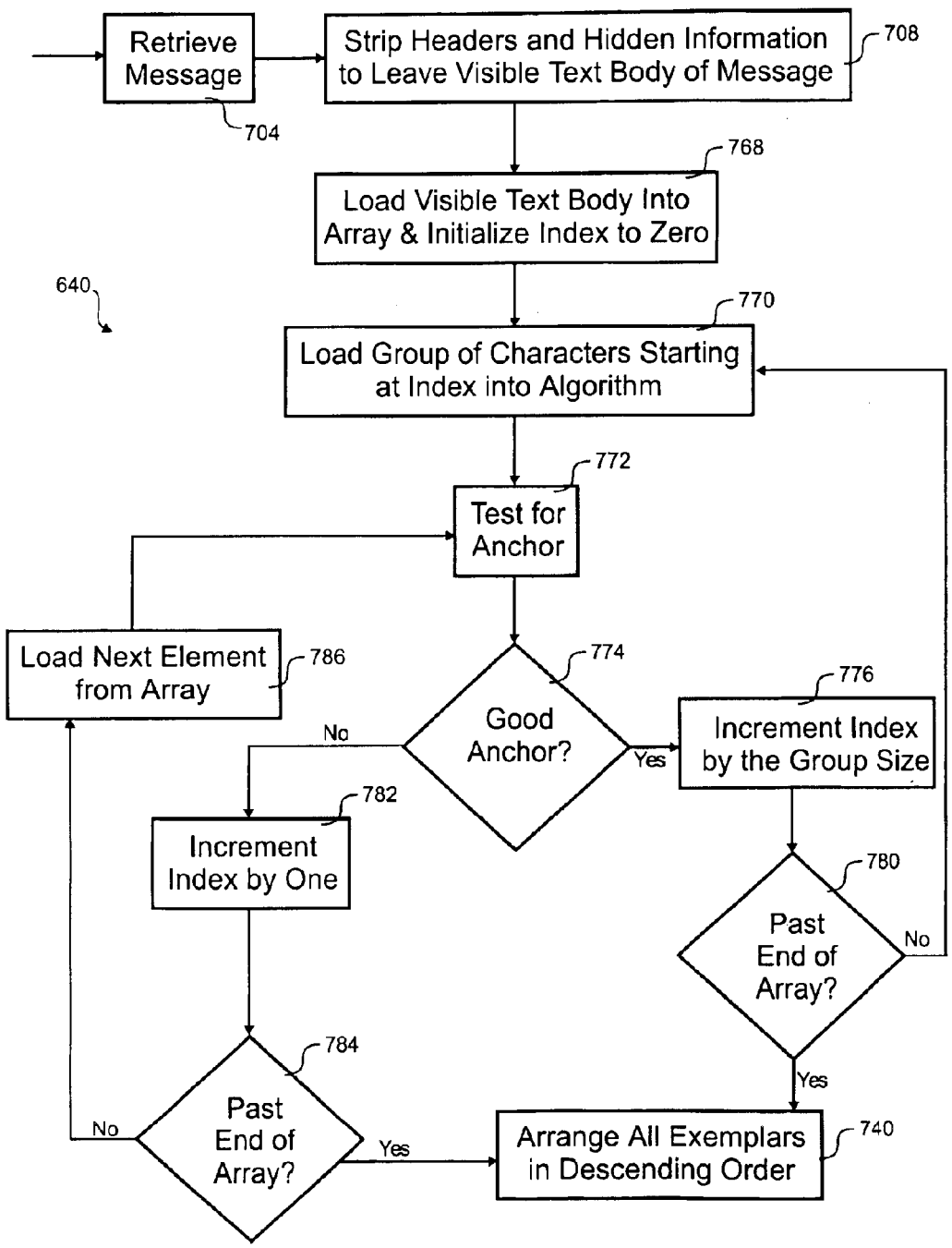
FIG. 7C is a flow diagram of yet another embodiment for producing a fingerprint for an e-mail message.

Referring next to FIG. 7C, a flow diagram 640 of yet another embodiment for producing a fingerprint for an e-mail message is shown. The process begins in step 704 where an e-mail message 400 is retrieved. Information such as headers or hidden information in the body 408 of the message 400 is removed to leave behind the visible body 408 of the message 400 in step 708. Hidden information is anything that is not visible the user when reading the message such as white text on a white background or other HTML information. Such hidden information could potentially confuse processing of the message 400.

To facilitate processing, the visible text body is loaded into a string or an array in step 768. The index of the array is initialized to zero or the first element of the array. In step 770, the first group of characters in the array are loaded into an exemplar algorithm. Although any algorithm that produces a compact representation of the group of characters could be used, the following equation is used in step 772:

$$E_n = \left(\sum_{i=1}^{i=20} t_i p^{20-i}\right) \bmod M \quad (1)$$

In Equation 1 above, the potential exemplar, E, starting at array index, n, is calculated for each of the group of characters, $t_i$, where p is a prime number and M is a constant. Four embodiments of values used for the $t_i$, M, and p constants are shown in Table II below.

TABLE II

| $t_i$ | M | p | X | Y |
|---|---|---|---|---|
| 20 | $2^{32}$ | 567,319 | $157_8$ | $55_8$ |
| 25 | $2^{32}$ | 722,311 | $147_8$ | $54_8$ |
| 30 | $2^{32}$ | 826,997 | $143_8$ | $50_8$ |
| 40 | $2^{32}$ | 914,293 | $61_8$ | $40_8$ |

Only some of the potential exemplars E resulting from Equation 1 are chosen as good anchors such that the potential exemplar E is stored in the fingerprint. Further to step 772, the potential exemplar E is converted to a binary value and masked by an octal value that is also converted to binary. If the result from the masking step includes any bits equal to one, the potential exemplar E is used in the fingerprint for the message 400. The large message algorithm uses a first octal value, X, converted into a binary mask and the small message algorithm uses a second octal value, Y, converted into a binary mask such that the small message algorithm is more likely to accept any potential exemplar E. See Table II for different embodiments of the first and second octal values X, Y.

If the potential exemplar E is chosen as an anchor in step 774, it is added to the fingerprint and the array index is incremented by the size of the group of characters, $t_i$, in step 776. The index is incremented to get a fresh set of characters to test for an anchor. If it is determined the whole array has been processed in step 780, the exemplars are arranged in descending order to allow searching more efficiently through the fingerprint during the matching process. Presuming the array is not completely analyzed, processing loops back to step 770 where a new group of characters are loaded and analyzed.

Alternatively, the index is only incremented by one in step 782 if the anchor is not chosen in step 774. Only a single new character is needed to calculate the next potential exemplar since the other nineteen characters are the same. The exit condition of passing the end of the array is checked in step 784. If the exit condition is satisfied, the next element from the array is loaded in step 786. A simplified Equation 2 may be used to determine the next potential exemplar, $E_{n+1}$, by adding the last coefficient and removing the first one:

$$E_{n+1}=(pE_n+t_{21}-p^{19}) \bmod M \quad (2)$$

In this way, the exemplars that form the fingerprint for the message body are calculated.

Figure 7D:
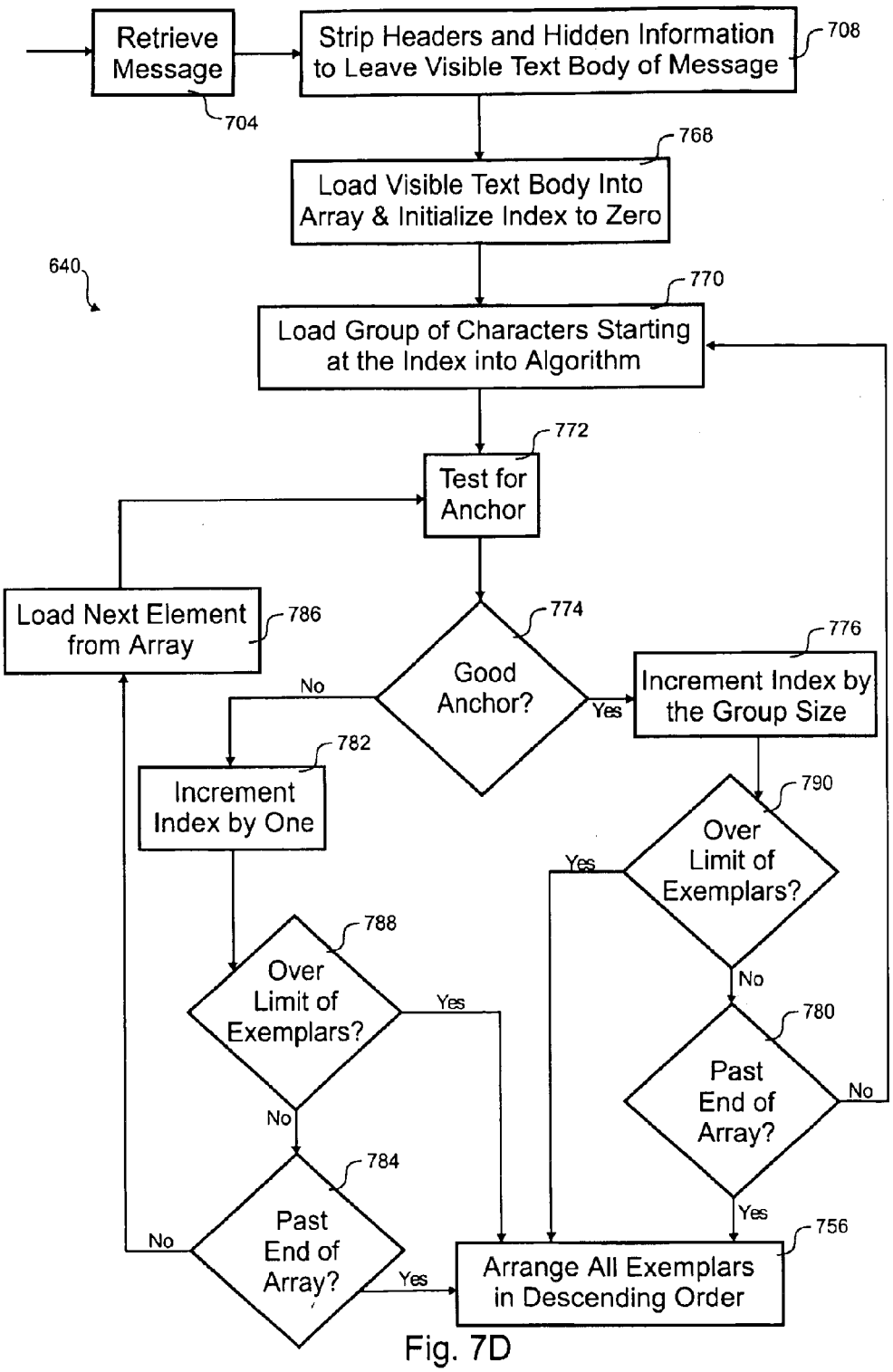
FIG. 7D is a flow diagram of still another embodiment for producing a fingerprint for an e-mail message.

Referring next to FIG. 7D, a flow diagram 640 of still another embodiment for producing a fingerprint for an e-mail message is shown. This embodiment differs from the embodiment of FIG. 7C in that it adds another exit condition to each loop in steps 788 and 790. Once a maximum number of exemplars is gathered as determined in either step 788 or 790, the loop exits to step 756 where the exemplars are sorted in descending order to form the fingerprint. Various embodiments could use, for example, five, fifteen, twenty, thirty, forty, or fifty exemplars as a limit before ending the fingerprinting process.

Figure 8:
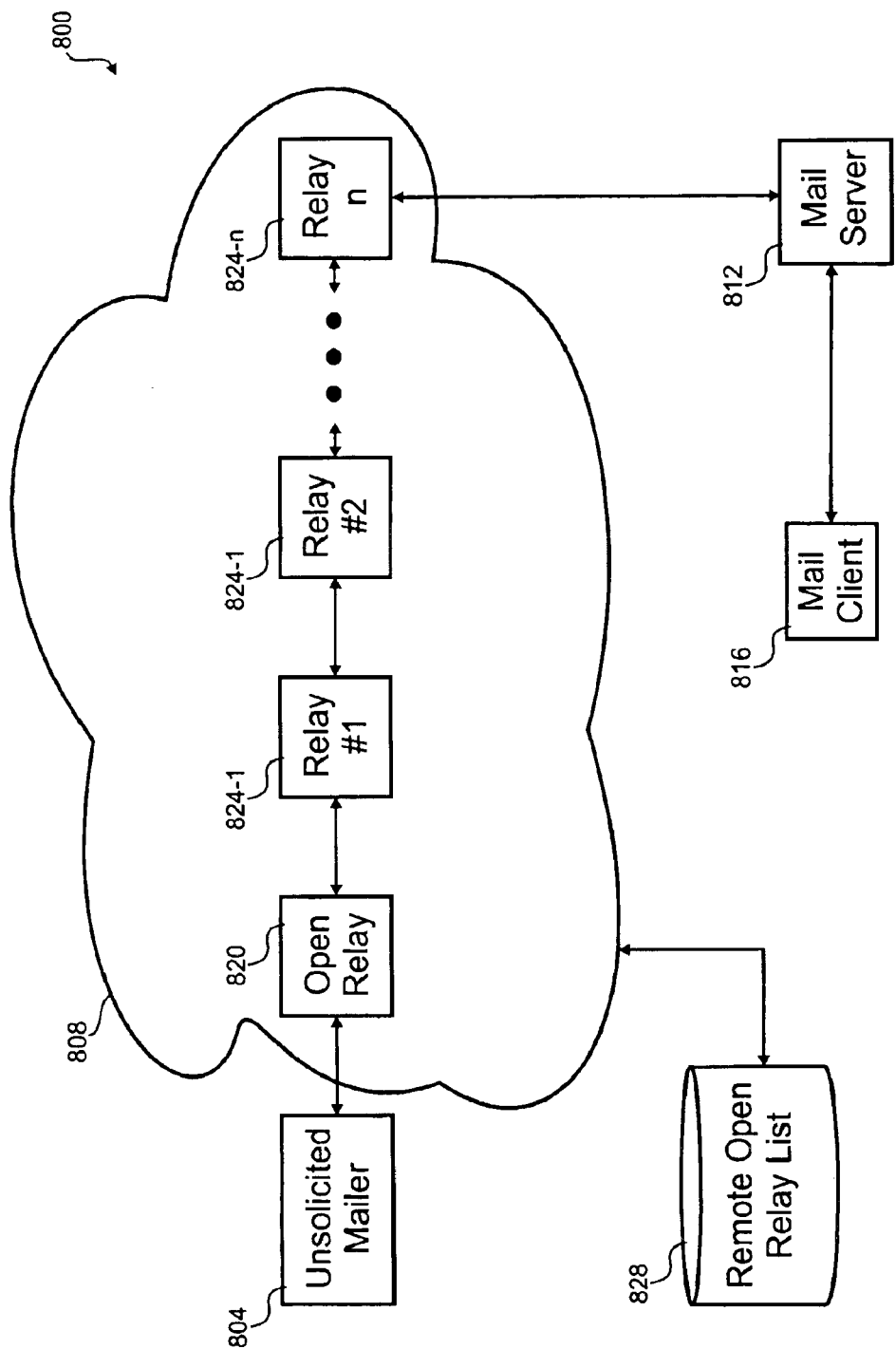
FIG. 8 is a block diagram that shows an embodiment of an e-mail distribution system.

With reference to FIG. 8, a block diagram of an embodiment of an e-mail distribution system 800 is shown. In this embodiment, a mail server 812 of the ISP stores the unread e-mail and a program on a mail client computer 816 retrieves the e-mail for viewing by a user. An unsolicited mailer 804 attempts to hide the true origin of a bulk e-mail broadcast by hiding behind an open relay 820 within the Internet 808.

Properly functioning relays 824 in the Internet do not allow arbitrary forwarding of e-mail messages 400 through the relay 824 unless the forwarding is into the domain of the receiver. For example, a user with an e-mail account at Yahoo.com can send e-mail through a properly functioning Yahoo.com relay to an Anywhere.com recipient, but cannot force a properly functioning relay at Acme.com to accept e-mail from that user unless the e-mail is addressed to someone within the local Acme.com domain. An open relay 820 accepts e-mail messages from any source and relays those messages to the next relay 824 outside of its domain. Unsolicited mailers 804 use open relays 820 to allow forgery of the routing information such that the true source of the e-mail message is difficult to determine. Also, an open relay 820 will accept a single message addressed to many recipients and distribute separate messages those recipients. Unsolicited mailers 804 exploit this by sending one message that can blossom into thousands of messages at the open relay 820 without consuming the bandwidth of the unsolicited mailer 804 that would normally be associated with sending the thousands of messages.

As mentioned above, unsolicited mailers 804 often direct their e-mail through an open relay 820 to make it difficult to determine which ISP they are associated with and to save their bandwidth. Most ISP have acceptable use policies that prohibit the activities of unsolicited mailers 804. Users often manually report receiving bulk e-mail to the ISP of the unsolicited mailer 804. In response to these reports, the ISP will often cancel the account of the unsolicited mailer 804 for violation of the acceptable use policy. To avoid cancellation, unsolicited mailers 804 hide behind open relays 820.

Lists 828 of known open relays 820 are maintained in databases on the Internet 808. These lists 828 can be queried to determine if a relay listed the header 404 of an e-mail message 400 is an open relay 820. Once the open relay 820 is found, the routing information prior to the open relay 820 is suspect and is most likely forged. The Internet protocol (IP) address that sent the message to the open relay 820 is most likely the true source of the message. Knowing the true source of the message allows notification of the appropriate ISP who can cancel the account of the unsolicited mailer 804. Other embodiments, could use a local open relay list not available to everyone on the Internet. This would allow tighter control of the information in the database and quicker searches that are not subject to the latency of the Internet.

Referring next to FIG. 9, an embodiment of an unsolicited e-mail header 900 revealing a route through an open relay and forged routing information is shown. Unsolicited mailers 804 use open relays 820 to try to hide the true origin of their bulk mailings, among other reasons. The header 900 includes routing information 904, a subject 908, a reply e-mail address 916, and other information.

The routing information 904 lists all the relays 824 that allegedly routed the e-mail message. The top-most entry 912-3 is the last relay that handled the message and the bottom entry 912-0 is the first relay that allegedly handled the message. If the routing information were correct, the bottom entry 912-0 would correspond to the ISP of the unsolicited mailer 804. The header 900 is forged and passed through an open relay 820 such that the bottom entry 912-0 is completely fabricated.

Even with the open relay 820 and forged entries 912, the true source of the message is usually discernable in an automatic way. Each entry 912 indicates the relay 824 the message was received from and identifies the relay 824 that received the message. For example, the last entry 912-3 received the message from domain "proxy.bax.beeast.com" 920 which corresponds to IP address 209.189.139.13 924. The last entry 912-3 was written by the relay 824 at "shell3.bax.beeast.com".

Each relay 824 is crossed against the remote open relay list 828 to determine if the relay is a known open relay 820. In the header 900 of this embodiment, the third entry from the top 912-1 was written by an open relay 820. The IP address 209.42.191.8 928 corresponding to the intranet.hondutel.hn domain was found in the remote open relay list 828. Accordingly, the protocol-level address 932 of the relay 824 sending the message to the open relay 820 is the true source of the message. In other words, the message originated from IP address of 38.30.194.143 932. The IP address 932 of the true source of the message is determined at the protocol level and is not forged. In this embodiment, the first and second entries 912-0, 912-1 are forged and cannot be trusted except for the protocol level IP address 932 of the true source.

Although this embodiment presumes the relay before the open relay is the true source of the message, other embodiments could perform further verification. In some instances, valid messages are routed through open relays as the path of any message through the Internet is unpredictable. For example, the suspected relay entries before the open relay could be inspected for forgeries, such as the IP address not matching the associated domain. If a forgery existed, that would confirm that an unsolicited mailer 804 had probably sent the message to the open relay 820.

This embodiment starts at the top-most entry and inspects relays before that point. Some embodiments could avoid processing the entries near the top of the list that are within the intranet of the mail client and associated with the mail server of the mail client. These relays are typically the same for most messages and can usually be trusted.

Figure 10:
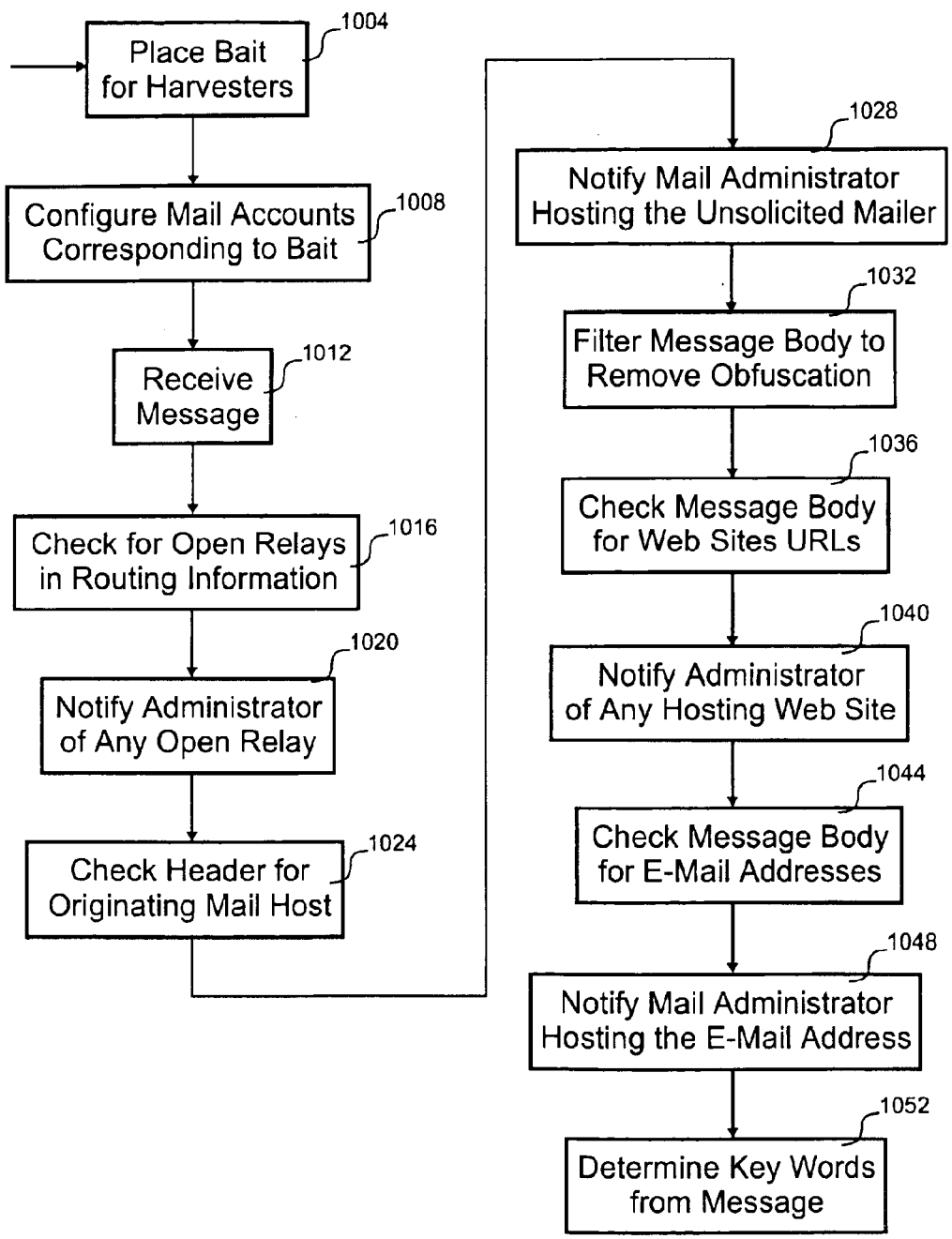
FIG. 10 is a flow diagram that shows an embodiment of a process for baiting unsolicited mailers and processing their e-mail messages.

With reference to FIG. 10, a flow diagram is shown of an embodiment of a process for baiting unsolicited mailers and processing their e-mail. The process begins in step 1004 where an e-mail address is embedded into a web page. List brokers are known to harvest e-mail addresses from web sites using automated crawling software robots or bots. The software bots follow links as they crawl through the net and harvest any e-mail addresses they encounter. The harvested e-mail addresses are added to the list, which is sold to unsolicited mailers 104. The unsolicited mailers 104 send e-mail in bulk to the addresses on the list.

Bait e-mail addresses could be disseminated to any forum that would have no legitimate reason to contact the bait e-mail addresses. Some embodiments could bait newsgroups or message boards with test messages that include a bait e-mail addresses. In other embodiments, auction web sites and other sites could have bait accounts such that if the e-mail address information is sold by the site or otherwise harvested unsolicited mailers will send mail to those addresses.

Some automated software bots are sophisticated enough to analyze the page embedding the e-mail addresses to determine if the page is legitimate. For example, the software bot could avoid harvesting e-mail from any page that makes reference to the word "Spam." This embodiment uses actual web pages and embeds into them the e-mail address bait such that it is difficult to see by the legitimate user browsing of that web page. By embedding e-mail bait into legitimate web pages, it is difficult for the software bots to avoid adding the bait e-mail addresses to their lists.

There are different techniques for embedding e-mail addresses unobtrusively into web pages. One technique places the e-mail address on the page, but uses the same color for the link text as the background color to make the link text invisible to the web browser unless the source hyper text markup language (HTML) is viewed. Another technique places the e-mail addresses in an extended margin such that the text is only viewable by the user if the page is scrolled to the far right to reveal an otherwise unused margin. In other embodiments, a combination of these techniques could be used on any number of web sites to increase the likelihood that one of the e-mail baits is found by the harvesting software bot.

E-mail harvesting bots follow links on pages when navigating the web. To assist these bots in finding the pages with the e-mail address bait, links could be placed in rat many pages that redirect the harvesting bots to relevant pages. A referring page could be referenced by an HTML link that is barely visible to the user of the web site. A single period character could serve as a link to web page with the e-mail bait. Additionally, the link could have the same color as the background color to further camouflage the link from the legitimate browser of the web site.

E-mail accounts are configured in step 1008 to correspond to th e e-mail bait on the various web sites. Since the e-mail addresses should be used for no purpose other than bulk e-mail, any messages sent to these accounts are presumed unsolicited. The unsolicited e-mail is accepted without bouncing because list brokers tend to remove addresses from their list that bounce. Bouncing is a process where the sender of an e-mail message is notified that the e-mail account is not available.

In step 1012, an unsolicited e-mail message is received. The mere receipt of an e-mail message addressed to one of the bait addresses confirms the message is unsolicited. To determine the source of the unsolicited e-mail message, processing is performed.

A check for open relays 820 in the routing information is performed to determine if the routing information is suspect. Starting with the last relay 824-n and ending with the open relay 820, the information in the header of the message is analyzed in step 1016. The IP address of each relay is checked against the remote open relay list 828 to determine if it is a known open relay 820. If an open relay 820 is found, the administrator responsible for that relay is notified by addressing an e-mail message to the postmaster at that UP address in step 1020. The notification occurs automatically without human intervention. Administrators of an open relay 820 are often unaware that their relay is misconfigured and will upgrade their relay to prevent future abuse from unsolicited mailers 804.

Once the open relay 820 is located in the routing information, the true source of the unsolicited message is determined. The IP address that sends the message to the open relay 820 is most likely to be the true source of the message. Routing information before that IP address of the open relay 820 is most likely forged and cannot be relied upon. The domain name associated with the true source of the message can be determined by querying a database on the Internet 808. Once the domain name is known, a message sent to the mail administrator hosting the unsolicited mailer at the "abuse" address for that domain in step 1028, e.g., abuse@yahoo.com. There are databases that provide the e-mail address to report unsolicited mailing activities to for the domains in the database. These databases could be used to more precisely address the complaint to the administrators in other embodiments.

The message body 408 often includes information for also locating the unsolicited mailer 804 responsible for the bulk e-mail. To take advantage of the offer described in the bulk e-mail, the user is given contact information for the unsolicited mailer 804, which may include a universal resource locator (URL) 420, a phone number, and/or an e-mail address. This information can be used to notify ISP related to any URL or e-mail address of the activities of the unsolicited mailer which probably violate the acceptable use policy of the ISP. Additionally, the contact information can provide key words for use in detecting other bulk mailings from the same unsolicited mailer 804.

To facilitate processing of the body of the message, the body 408 is decoded in step 1032. Unsolicited mailers 804 often use obscure encoding such as the multipurpose mail encoding (MIME) format and use decimal representations of IP addresses. Decoding converts the message into standard text and converts the IP addresses into the more common dotted-quad format.

The processed message body is checked for URLs and e-mail addresses in steps 1036 and 1044. The ISP or upstream providers are notified of the activities of the unsolicited mailer in steps 1040 and 1048. Upstream providers can be determined for a URL by searching databases on the Internet 808 for the ISP that hosts the domain name in the URL. When notifying the enabling parties, the administrator of the domain of the unsolicited mailer itself should not be contacted to avoid notifying the unsolicited mailer 804 of the detection of their bulk mailings. If notice is given, the unsolicited mailer 804 could remove the bait e-mail address from their list. Accordingly, the ISP that hosts the unsolicited mailers URL should be contacted instead.

Other real e-mail accounts could filter out unwanted bulk mail from unsolicited mailers 804 using key words. Contact information for an unsolicited mailer 804 can uniquely identify other mail from that unsolicited mailer. The contact information is gathered from the message and added to the key word database 230 in step 1052. As described in relation to FIGS. 7A–7D above, exemplars indicative of the message could also be gathered. When other e-mail messages are received by the mail server 812, those messages are screened for the presence of the key words or exemplars. If found, the message is sorted into a bulk mail folder.

Figure 11:
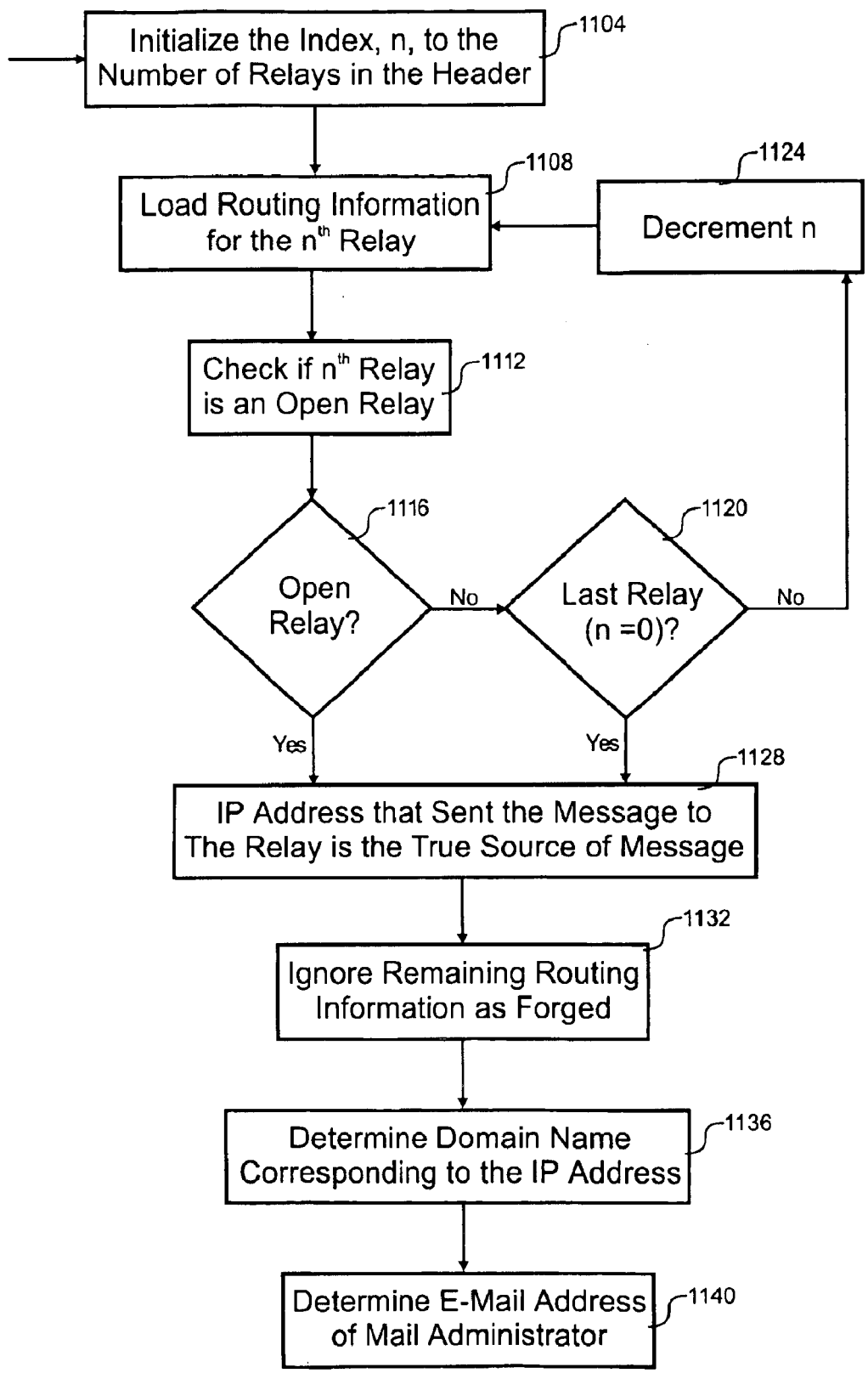
FIG. 11 is a flow diagram that shows an embodiment of a process for determining the source of an e-mail message.

Referring next to FIG. 11, a flow diagram is shown of an embodiment of a process for determining the source of an e-mail message. This process determines the true source of an unsolicited e-mail message such that a facilitating ISP can be automatically notified of the potential violation of their acceptable use policy. The process involves tracing the route from the mail server 812 back to the unsolicited mailer 804.

The process begins in step 1104 where an index, n, is initialized to the number of relays entries 912 in the header 900. As the message hops through the Internet 808, each relay 824 places their identification information and the identification information of the party they received the message from at the top of the e-mail message. The identification information includes the IP address and domain name for that IP address. The index n is equal to the number of relays that message allegedly encountered while traveling from the unsolicited mailer 804 to the mail server 812 minus one. For example, the embodiment of FIG. 9 encountered four relays so the index is initialized to three.

In steps 1108 through 1124, the loop iteratively processes each entry 912 of the routing information 904 in the header 900 of the message. In step 1108, the $n^{th}$ entry or the topmost unanalyzed entry 912 is loaded. The IP address of the relay that received message is checked against the remote open relay list 828 to determine if the relay 824 is an open relay 820 in step 1112.

If the relay 824 is not an open relay 820 as determined in step 1116, processing continues to step 1120. A further determination is made in step 1120 as to whether the last entry 912 of the routing information 904 has been analyzed. If the current entry at index n is not the last entry, the index n is decremented in step 1124 in preparation for loading the next entry in the routing information in step 1108.

Two different conditions allow exit from the loop that iteratively check entries 912 in the routing information 904. If either the tests in steps 116 or 120 are satisfied, processing continues to step 1128. The exit condition in step 1120 is realized when the unsolicited mailer 804 does not attempt to hide behind an open relay 820. Under those circumstances, the IP addresses in the routing information is trusted as accurate. Such that the last entry 912 corresponds to the unsolicited mailer 804.

In step 1128, the IP address that sent the message to the current relay 824 is presumed the true source of the message. Any remaining entries in the routing information are pre-sumed forged and are ignored in step 1132. The domain name corresponding to the IP address of the true source is determined in step 1136. The administrator for that domain is determined in step 1140 by referring to a database on the Internet. If there is no entry in the database for that domain name, the complaint is addressed to the "abuse" e-mail account. In this way, the e-mail address for the ISP facilitating the unsolicited mailer 804 is determined such that a subsequent complaint can be automatically sent to that e-mail address.

Figure 12:
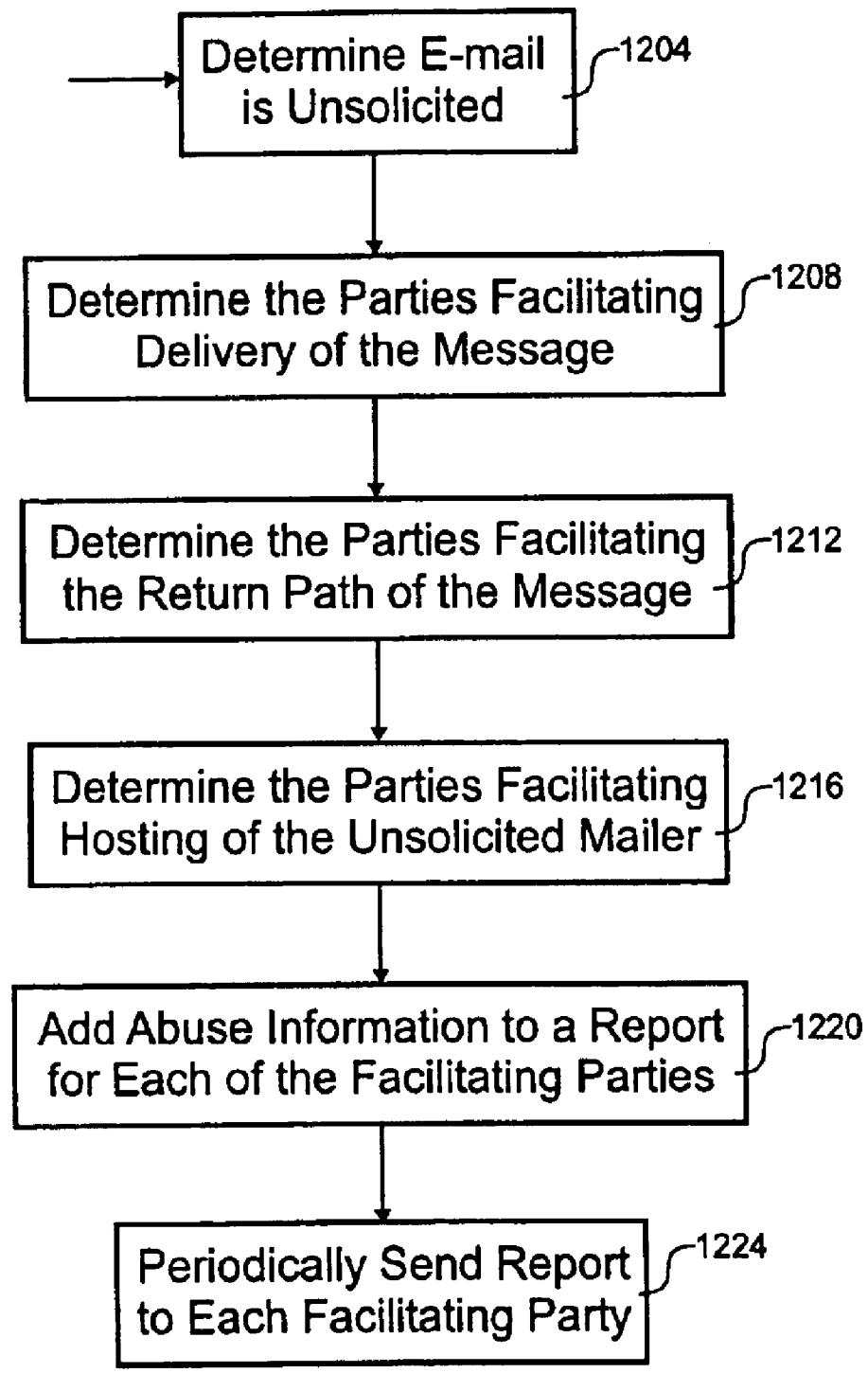
FIG. 12 is a flow diagram that shows an embodiment of a process for notifying facilitating parties associated with the unsolicited mailer of potential abuse.

With reference to FIG. 12, an embodiment of a process for notifying facilitating parties associated with the unsolicited mailer 804 of potential abuse is shown. The process begins in step 1204 where an e-mail message is recognized as being unsolicited. There are at least two ways to perform this recognition. The first method involves searching for similar messages and is described in relation to FIGS. 7A–7D above. In the second method, bait e-mail addresses are planted across the Internet. The bait addresses are put in places where they should not be used such that their use indicates the e-mail is unsolicited. These places include embedding the electronic mail address in a web page, applying for an account with a web site using the electronic mail address, participating in an online auction with the electronic mail address, posting to a newsgroup or message board with the electronic mail address, and posting to a public forum with the electronic mail address.

Once an e-mail message is identified as originating from an unsolicited mailer 104, the parties facilitating the unsolicited mailer are identified. Generally, the unsolicited mailer is violating the acceptable use policy of the unsuspecting facilitating party and notification is desired by the facilitating party such that the account of the unsolicited mailer 104 can be shut down.

The facilitating parties of the unsolicited mailer fall into three categories, namely, the origination e-mail address 428 in the header 404, the reply e-mail address 432 in the header 404 or an e-mail address referenced in the body 408 of the message 400, and a URL referenced in the body 408 of the message 400. The e-mail addresses in the header 404 are often misleading, but the e-mail addresses or URLs in the body 408 are often accurate because a true point of contact is needed to take advantage of the information in the e-mail message 400.

In step 1208, the parties facilitating the delivery of the message are determined. One embodiment of this determination process is depicted in FIG. 11 above. These facilitating parties include an ISP associated with the originating e-mail account and/or upstream providers for the ISP. This could also include the e-mail address 428 of the sender from the header 404 of the message 400.

In step 1212, the parties facilitating the return path for interested receivers of the e-mail are determined. The reply address 432 or an address in the body 408 of the message 400 could be used to determine the reply path. With the domain name of these addresses, the administrator can easily be contacted.

Referring next to step 1216, any parties hosting web sites for the unsolicited mailer 104 are determined. The body 404 of the message 400 is searched for links to any web sites. These links presumably are to sites associated with the unsolicited mailer 104. The host of the web site often prohibits use of unsolicited e-mail to promote the site. To determine the domain name of the host, it may be necessary to search a publicly available database. With the domain name, the administrator for the host can be found.

Once the responsible parties associated with the unsolicited mailer 104 are identified in steps 1208, 1212 and 1216, information detailing the abuse is added to a report for each facilitating party. Other embodiments could report each instance of abuse, but this may overload anyone with the facilitating party reading this information. In some embodiments, the report could include the aggregate number of abuses for an unsolicited mailer(s) 104 associated with the facilitating party. The unsolicited messages could also be included with the report.

In step 1224, the report for each facilitating party is sent. In this embodiment, the report is sent once a day to the administrator and includes abuse for the last day. Other embodiments, however, could have different reporting schedules. Some embodiments could report after a threshold of abuse is detected for that facilitating party. For example, the mail system 112 waits until over a thousand instances of unsolicited mail from one unsolicited mailer before reporting the same to the facilitating party. Still other embodiments, could report periodically unless a threshold is crossed that would cause immediate reporting.

In light of the above description, a number of advantages of the present invention are readily apparent. Textual communication can be analyzed with an adaptive algorithm to find similar textual communication. After finding similar textual communication, filters can automatedly process similar textual communication. For example, a bulk e-mail distribution from an unsolicited mailer can be detected such that the messages can be sorted into a bulk mail folder.

A number of variations and modifications of the invention can also be used. For example, the invention could be used by ISPs on the server-side or users on the client-side. Also, the algorithm could be used for any task requiring matching of messages to avoid reaction to repeated messages. For example, political campaigns or tech support personnel could use the above invention to detect multiple e-mails on the same subject.

In another embodiment, the present invention can be used to find similarities in chat room comments, instant messages, newsgroup postings, electronic forum postings, message board postings, and classified advertisement. Once a number of similar electronic text communications are found, subsequent electronic text can be automatedly processed. Processing may include filtering if this bulk advertisement is unwanted, or could include automated responses. Advertisement is published in bulk to e-mail accounts, chat rooms, newsgroups, forums, message boards, and classifieds. If this bulk advertisement is unwanted, the invention can recognize it and filter it accordingly.

In some embodiments, the invention could be used for any task requiring matching of electronic textual information to avoid reaction to repeated messages. For example, political campaigns or tech support personnel could use the above invention to detect multiple e-mails on the same subject. Specifically, when the e-mail account holders complain to customer service that a e-mail is mistakenly being sorted into the bulk mail folder, customer service does not need multiple requests for moving the sender to the approved list. The invention can recognize similar requests and only present one to customer service.

In yet another embodiment-real e-mail accounts that receive unsolicited e-mail could detect that the message is likely to be unsolicited and respond to the sender with a bounce message that would fool the sender into thinking the e-mail address is no longer valid. The list broker would likely remove the e-mail address from their list after receipt of bounce message.

In still other embodiments, duplicate notifications to an ISP could be avoided. Once the first bait e-mail address receives an unsolicited e-mail message and the facilitating ISP is notified, subsequent messages to other bait e-mail addresses that Ad would normally result in a second notification could be prevented. Excessively notifying the ISP could anger the administrator and prevent prompt action.

In yet another embodiment, the notification of facilitating parties could use protocols other than e-mail messages. The abuse could be entered by the mail system into a database associated with the facilitating party. This embodiment would automate the reporting to not require human review of the report in an e-mail message. Reporting could automatically shut down the unsolicited mailers account.

In light of the above description, a number of advantages of the present invention are readily apparent. Textual communication can be analyzed with an adaptive algorithm to find similar textual communication. After finding similar textual communication, filters can automatedly process similar textual communication. For example, a bulk e-mail distribution from an unsolicited mailer can be detected such that the messages can be sorted into a bulk mail folder.

Although the invention is described with reference to specific embodiments thereof, the embodiments are merely illustrative, and not limiting, of the invention, the scope of which is to be determined solely by the appended claims.

What is claimed is:

1. A method for detecting electronic text communication distributed in bulk, the method comprising steps of:
  receiving a first electronic text communication;
  determining if a character count of the first electronic text communication exceeds a first threshold;
  choosing a fingerprint algorithm based upon the step of determining if the character count of the first electronic text communication exceeds the first threshold;
  processing the first electronic text communication with an algorithm to produce a first fingerprint;
  beginning a time period for the first electronic text communication;
  receiving a second electronic text communications;
  processing the second electronic text communications with the algorithm to produce a second fingerprint;
  comparing the first fingerprint to the second fingerprint to determine if the first electronic text communication is similar to the second electronic text communication;
  updating a count for the first electronic text communication based upon the comparing step; and
  determining if the count during the time period reaches a second threshold.

2. The method for detecting electronic text communication distributed in bulk as recited in claim 1, further comprising a step of filtering subsequent electronic text communications similar to the first electronic text communication.

3. The method for detecting electronic text communication distributed in bulk as recited in claim 1, wherein the first listed processing step comprises a step of calculating a histogram where counts are determined for words in the first electronic text communication.

4. A method for detecting electronic text communication distributed in bulk, the method comprising steps of:
  receiving a first electronic text communication;
  processing the first electronic text communication with an algorithm to produce a first fingerprint;
  beginning a time period for the first electronic text communication;
  receiving a second electronic text communications;

processing the second electronic text communications with the algorithm to produce a second fingerprint;

comparing the first fingerprint to the second fingerprint to determine if the first electronic text communication is similar to the second electronic text communication, wherein a match is determined from the comparing step even if the first fingerprint and the second fingerprint differ by a percentage;

updating a count for the first electronic text communication based upon the comparing step; and determining if the count during the time period reaches a first threshold.

5. The method for detecting electronic text communication distributed in bulk as recited in claim 1, further comprising steps of:

determining network addresses for the first and second electronic text communications; and modifying the first threshold based upon the step of determining network addresses.

6. A method for detecting electronic text communication distributed in bulk, the method comprising steps of:

receiving an electronic text communication;

determining if a character count of the electronic text communication exceeds a first threshold;

choosing a fingerprint algorithm based upon the step of determining if the character count of the electronic text communication exceeds the first threshold;

processing the electronic text communication with an algorithm to produce a fingerprint;

beginning a time period associated with the electronic text communication;

receiving a plurality of electronic text communications;

processing the plurality electronic text communications with the algorithm to produce a plurality of fingerprints;

comparing the plurality of fingerprints to the fingerprint in order to determine how many of the plurality of electronic text communications are similar to the electronic text communication;

counting an amount of the plurality of electronic text communications that are similar to the electronic text communication; and determining if the amount during the time period reaches a second threshold.

7. The method for detecting electronic text communication distributed in bulk as recited in claim 6, further comprising a step of filtering subsequent electronic text communications similar to the electronic text communication.

8. The method for detecting electronic text communication distributed in bulk as recited in claim 6, wherein the first listed processing step comprises a step of calculating a histogram where counts are determined for words in the electronic text communication.

9. The method for detecting electronic text communication distributed in bulk as recited in claim 6, wherein the electronic text communication is chosen from a group consisting of a chat room comment, an instant message, a newsgroup posting, an electronic forum posting, a message board posting, and a classified advertisement.

10. The method for detecting electronic text communication distributed in bulk as recited in claim 6, further comprising steps of:

determining network addresses for the electronic text communication and each of the subset; and modifying the first threshold based upon the step of determining network addresses.

11. A method for blocking electronic text communication distributed in bulk, the method comprising steps of:

receiving an electronic text communication;

removing non-textual information from the electronic text communication;

generating a fingerprint indicative of the electronic text communication;

beginning a time period in relation to the first listed receiving step;

receiving a plurality of electronic text communications;

generating a plurality of fingerprints corresponding to the plurality of electronic text communications;

determining a subset of the plurality of electronic text communications that are similar to the electronic text communication;

counting a size of the subset;

determining if the size during the time period reaches a first threshold; and filtering subsequent electronic text communications similar to the electronic text communication.

12. The method for blocking electronic text communication distributed in bulk as recited in claim 11, wherein the first listed generating step comprises a step of calculating a histogram where counts are determined for words in the electronic text communication.

13. A method for blocking electronic text communication distributed in bulk the method comprising steps of:

receiving an electronic text communication;

determining if a character count of the electronic text communication exceeds a first threshold;

choosing a fingerprint algorithm based upon the step of determining if the character count of the electronic text communication exceeds the first threshold;

generating a fingerprint indicative of the electronic text communication;

beginning a time period in relation to the first listed receiving step;

receiving a plurality of electronic text communications;

generating a plurality of fingerprints corresponding to the plurality of electronic text communications;

determining a subset of the plurality of electronic text communications that are similar to the electronic text communication;

counting a size of the subset;

determining if the size during the time period reaches a second threshold; and filtering subsequent electronic text communications similar to the electronic text communication.

14. The method for blocking electronic text communication distributed in bulk as recited in claim 11, wherein the electronic text communication is chosen from a group consisting of a chat room comment, an instant message, a newsgroup posting, an electronic forum posting, a message board posting, and a classified advertisement.

15. The method for blocking electronic text communication distributed in bulk as recited in claim 11, further comprising a step of removing everything from the electronic text communication except a message body.

16. The method for blocking electronic text communication distributed in bulk as recited in claim 11, further comprising steps of:

determining network addresses for the electronic text communication and each of the subset; and modifying the first threshold based upon the step of determining network addresses.

17. The method for detecting electronic text communication distributed in bulk as recited in claim 4, further comprising a step of filtering subsequent electronic text communications similar to the first electronic text communication.

18. The method for detecting electronic text communication distributed in bulk as recited in claim 4, wherein the first listed processing step comprises a step of calculating a histogram where counts are determined for words in the first electronic text communication.

19. The method for detecting electronic text communication distributed in bulk as recited in claim 4, further comprising steps of:

determining network addresses for the first and second electronic text communications; and modifying the first threshold based upon the step of determining network addresses.

20. The method for blocking electronic text communication distributed in bulk as recited in claim 13, wherein the first listed generating step comprises a step of calculating a histogram where counts are determined for words in the electronic text communication.

21. The method for blocking electronic text communication distributed in bulk as recited in claim 13, wherein the electronic text communication is chosen from a group consisting of a chat room comment, an instant message, a newsgroup posting, an electronic forum posting, a message board posting, and a classified advertisement.

22. The method for blocking electronic text communication distributed in bulk as recited in claim 13, further comprising a step of removing everything from the electronic text communication except a message body.

23. The method for blocking electronic text communication distributed in bulk as recited in claim 13, further comprising steps of:

determining network addresses for the electronic text communication and each of the subset; and modifying the first threshold based upon the step of determining network addresses.

* * * * *